United States Patent [19]
Yonezawa

[11] Patent Number: 5,410,418
[45] Date of Patent: Apr. 25, 1995

[54] APPARATUS FOR CONVERTING IMAGE SIGNAL REPRESENTING IMAGE HAVING GRADATION

[75] Inventor: Yasuharu Yonezawa, Kyoto, Japan

[73] Assignee: Dainippon Screen Mfg. Co., Ltd., Kyoto, Japan

[21] Appl. No.: 76,807

[22] Filed: Jun. 14, 1993

[30] Foreign Application Priority Data

Jun. 24, 1992 [JP] Japan .................................. 4-191531
Jun. 30, 1992 [JP] Japan .................................. 4-197589

[51] Int. Cl.$^6$ .............................................. H04N 1/40
[52] U.S. Cl. .................... 358/456; 358/458; 358/464
[58] Field of Search ............... 358/456, 462, 463, 458, 358/464

[56] References Cited

U.S. PATENT DOCUMENTS

| | | | |
|---|---|---|---|
| 4,792,978 | 2/1988 | Nomura et al. | 358/458 |
| 4,975,970 | 12/1990 | Zettel et al. | 382/51 |
| 4,984,071 | 1/1991 | Yonezawa | 358/521 |
| 5,280,367 | 1/1994 | Zuniga | 356/462 |

FOREIGN PATENT DOCUMENTS 0283255  3/1988  European Pat. Off. .

OTHER PUBLICATIONS

*Patent Abstracts of Japan*, vol. 13, No. 429 (E-823), Dec. 17, 1987 & JP-A-1160167, Fuji Photo Film, Jun. 23, 1989.

Primary Examiner—Scott A. Rogers
Assistant Examiner—Thomas L. Stoll
Attorney, Agent, or Firm—Ostrolenk, Faber, Gerb & Soffen

[57] ABSTRACT

An apparatus for converting an image signal representing an image having gradation includes a first density histogram generator. The first density histogram generator generates a first density histogram based on a first image signal which is obtained by reading a data read region. Of peak portions formed in the first density histogram, the density rank value of a peak portion which satisfies a predetermined condition is detected. A pixel-to-be-removed detector determines pixels-to-be-removed whose average densities are included in a pixel removal density range which corresponds to the detected peak portion density rank value. A second density histogram is generated from the pixels remaining after the removal of the pixels-to-be-removed. Based on the second density histogram, a cumulative density histogram is generated to thereby find a highlight point and a shadow point through which a gradation curve passes. Then, the gradation curve is established and an image processing part converts the first image signal into a second image signal in accordance with the established gradation curve.

30 Claims, 19 Drawing Sheets

APPARATUS FOR CONVERTING IMAGE SIGNAL REPRESENTING IMAGE HAVING GRADATION

BACKGROUND OF THE INVENTION

1. Field of the Invention

The present invention relates to an apparatus for converting an image signal which represents an image having a gradation, and more particularly, to an image processing apparatus for automatically establishing reference points (highlight and/or shadow points) in a gradation converter which is mounted therein.

2. Description of the Prior Art

As an image processing apparatus for generating a halftone dot image (reproduced image) from an original image, a color process scanner disclosed in U.S. Pat. No. 4,679,095 by the inventor of the present invention is known. The color process scanner disclosed in the '095 patent comprises a scanning reader 101, an image processor 102, a scanning recorder 103, a display device 104 and an information processor 105 as shown in FIG. 18.

The scanning reader 101 reads the image data of an original image (not shown) mounted on an input cylinder (or an original table). The original image consists of arrays of pixels and the image data are fed as electrical signals each expressing the density of each pixel of the pixel arrays.

The image processor 102 comprises a look-up table for setting up a gradation curve which represents conversion characteristics or a color computation circuit or the like for converting image data regarding the color components B, G and R into image data regarding the color components Y, M, C and K. In the image processor 102, the input image data read by the scanning reader 101 are processed at the look-up table or the color computation circuit or the like. Thus, the input image data are converted into output image data.

The scanning recorder 103 comprises a dot generator for converting the output image data received from the image processor 102 into a halftone dot signal in accordance with which a halftone dot image is recorded onto a photosensitive material (not shown) which is wound on an output cylinder (or which is fed on a plane).

The display device 104 comprises a CRT display (not shown in FIG. 18) as a display main unit. An image based on the image data processed by the image processor 102 is displayed on the CRT display.

The information processor 105 comprises a console, a CPU, a memory and the like. In accordance with the input image data read by the scanning reader 101, the information processor 105 calculates a gradation curve to be set up in the look-up table of the image processor 102. In addition, the information processor 105 is capable of amending the gradation curve and designating any desired region of the image which is displayed on the CRT display of the display device 104 by means of the console.

The information processor 105 sets up the gradation curve in the following manner.

First, the original image is prescanned to obtain the input image data. The input image data are processed by the image processor 102 in which standard set-up conditions have been set standard. The display device 104 displays an image A (See FIG. 9A) in accordance with the processed image data.

Next, an operator designates a subject region B (See FIG. 9A) of the image, A by operating the console of the information processor 105 while observing the image A.

Following this, based on the image data about the subject region B of the input image data read by prescanning, a density histogram such as that shown in FIG. 19 is obtained. The density histogram shows a relation between the density of the subject region B and the number of pixels which defines the density in the subject region B (i.e., appearance frequencies of pixels). In FIG. 19, indicated at reference character DM is a density rank value and indicated at reference character N is the number of the pixels (i.e., appearance frequencies of pixels).

Next, the pixel appearance frequencies in the density histogram are serially accumulated in increasing order of the density rank value to develop a cumulative density histogram as that shown in FIG. 20. In FIG. 20, a cumulative value of the appearance frequencies is shown as a relative frequency. Indicated at reference character DM in FIG. 20 is a density value and RN is a cumulative relative frequency of the pixels.

Cumulative relative frequencies RNH and RNS are then determined. The cumulative relative frequencies RNH and RNS are necessary to find an optimum highlight density DH and an optimum shadow density DS. The cumulative relative frequencies RNH and RNS are obtainable by experience, for example, from a number of sample originals which are prepared in advance. In most cases, the cumulative relative frequency RNH is around 1% and the cumulative relative frequency RNS is around 98%.

The cumulative relative frequencies RNH and RNS are thereafter applied to the cumulative density histogram of FIG. 20 to thereby find density rank values which correspond to the cumulative relative frequencies RNH and RNS. The density rank values are determined as the highlight density DH and the shadow density DS, respectively.

Output halftone area rates which correspond to the highlight density DH and the shadow density DS are then set in order to determine a highlight point HL and a shadow point SD each serving as a reference point of a gradation curve on a density conversion coordinate plane (FIG. 21).

Next, a gradation curve which passes through the highlight point HL and the shadow point SD is generated. The gradation curve may be a gradation curve with standard characteristics which is preliminarily selected in accordance with the original image, or may be developed by a known method, e.g., the method disclosed by the inventor of the present invention in U.S. Pat. No. 4,792,979. U.S. Pat. No. 4,792,979 discloses that an original image is prescanned to generate the density histogram in accordance with which a second gradation curve is developed. The second gradation curve is then combined with a first gradation curve with standard characteristics which has been preliminarily prepared to thereby generate a third gradation curve which will be determined as a gradation curve which passes through the highlight point HL and the shadow point SD.

Based on the gradation curve generated in this manner, the image data are gradation-converted. A resultant output image is displayed by the display device 104. The operator manipulates the information processor 105 while observing the image displayed by the display device 104. Thus, the gradation curve is adjusted if necessary.

The adjusted gradation curve is then set up in a look-up table which is stored in the image processor 102.

After setting up the gradation curve in the look-up table, the original image,is scanned by the scanning reader 101, thereby generating a reproduced image having a gradation which is converted in accordance with the gradation curve which is set up in the look-up table.

As hereinabove described, conventional gradation conversion demands an operator's manual work of designating the subject region B which is to be processed prior to setting up of the gradation curve, i.e., establishment of the reference density points. As with the case of the color process scanner described above, in particular, which is to be adaptive to various types of originals, mounting angles of an original image and etc., the subject region B cannot be easily determined in the same manner. Hence, manual designation of the subject region B by an operator is indispensable. This prevents unmanned operation of the above color process scanner, and remains as an obstacle to complete automatic operation of the color process scanner.

SUMMARY OF THE INVENTION

The present invention is directed to an image signal conversion apparatus for converting a first image signal representative of an original image having gradation into a second image signal to modify the gradation, wherein said original image includes a pixel array and the first image signal represents respective densities of pixels included in the pixel array. According to the present invention, the image signal conversion apparatus includes: (a) means for classifying the pixels into a plurality of density ranks in accordance with the respective values of the first image signal and generating a first density histogram representing the number of pixels which belong to the respective density ranks, the first density histogram including at least one peak portion; (b) means, for extracting a peak portion which satisfies a predetermined condition from the at least one peak portion to thereby obtain a detected peak portion; (c) means for calculating a pixel removal density range in accordance with a density rank value which corresponds to the detected peak portion; (d) means for extracting pixels whose value of the first image signal belongs to the pixel removal density range from pixels which form the data read region to thereby obtain pixels-to-be-removed; (e) means for classifying pixels which remain after removal of the pixels-to-be-removed from the pixels which form the data read region into a plurality of density ranks in accordance with the values of the first image signal to thereby generate a second density histogram representing the number of pixels which belong to the respective density ranks; (f) means for determining a reference point on a gradation conversion coordinate plane in accordance with the second density histogram; (g) means for determining signal conversion characteristics in accordance with the reference point; (h) means for setting the signal conversion characteristics in the signal convertor; and (i) means for inputting the first image signal to the signal convertor and receiving an output signal from the signal convertor as the second image signal, whereby the first image signal is converted into the second image signal.

Thus, according to the present invention, from the peak portions of the first density histogram obtained based on the pixel signal about the data read region, a peak portion which is located at a position at which a predetermined condition is satisfied is detected. The pixels included in the pixel removal density range which includes the detected peak portion are removed from the pixels which form the data read region. That is, the pixels which form the data read region are divided into pixels which are to be used in establishing the reference density points and pixels otherwise, and the latter pixels are removed. In accordance with the second density histogram regarding the pixels which remain after removal of the pixels-to-be-removed from the pixels which form the data read region, the reference points on the gradation conversion coordinate plane are found. Based on the reference points thus obtained, signal conversion characteristics are found, making it possible that the first image signal is converted into the second image signal by a signal convertor.

Hence, it is possible to automatically remove the pixels which form the peripheral region from the pixels which form the data read region, which in turn allows omission of manual designation of the subject region by an operator.

An image signal conversion apparatus according to another aspect of the invention for converting a first image signal representative of an original image having gradation into a second image signal to modify the gradation, wherein the original image includes a pixel array and the first image signal represents respective densities of pixels included in the pixel array, the image signal conversion apparatus includes: (a) means for classifying the pixels into a plurality of density ranks in accordance with the respective values of the first image signal and generating a first density histogram representing the number of pixels which belong to the respective density ranks, the first density histogram including at least one peak portion; (b) means for extracting a peak portion satisfies a predetermined first condition which corresponds to the peripheral region from the at least one peak portion to thereby obtain a first removal candidate peak portion; (c) means for classifying pixels which remain after removal of pixels which are included in a pixel distribution surge portion around the first removal candidate peak portion from the pixels which form the data read region into a plurality of density ranks in accordance with the respective values of the first image signal and generating a second density histogram representing the number of pixels which belong to the respective density ranks, the second density histogram including at least one peak portion; (d) means for extracting a peak portion which satisfies a predetermined second condition which corresponds to the peripheral region from the at least one peak portion of the second density histogram to thereby obtain a second removal candidate peak portion; (e) means for comparing the density of the first removal candidate peak portion with the density of the second removal candidate peak portion; (f) means for selecting a removal cancel peak portion from the first and the second removal candidate peak portions in accordance with a result of the comparison; (g) means for calculating a pixel removal density range which includes a peak portion which remains after excluding the removal cancel peak portion from the first and the second removal candidate peak portions; (h) means for selecting pixels whose value of the first image signal belongs to the pixel removal density range among the pixels which form the data read region as pixels-to-be-removed; (i) means for classifying pixels which remain after removal of the pixels-to-be-removed from the pixels which form the data read region into a plurality of density ranks in accordance with the values of the first image signal to thereby generate a third density histogram representing the number of pixels which belong to the respective density ranks; (j) means for determining a reference point on a gradation conversion coordinate plane in accordance with the third density histogram; (k) means for determining signal conversion characteristics in accordance with the reference points; (l) means for setting the signal conversion characteristics in the signal convertor; and (i) means for inputting the first image signal to the signal convertor and receiving an output signal from the signal convertor as the second image signal, whereby the first image signal is converted into the second image signal.

Thus, according to the present invention, if the first removal candidate peak portion is a removal candidate peak portion which includes even the pixels of the subject region, the associated second removal candidate peak portion appears nearer to an end of the density range than the first removal candidate peak portion.

Hence, if the second removal candidate peak portion is nearer to an end of the density range than the associated first removal candidate peak portion, this first removal candidate peak portion is regarded as a removal cancel peak portion. By removing pixels-to-be-removed including the pixels which are within the pixel removal density range regarding the first and the second removal candidate peak portions except for the removal cancel peak portion, the pixels which form the peripheral region are removed from the pixels which form the data read region. In accordance with the third density histogram about the pixels which remain after removal of said pixels-to-be-removed, the reference density points are determined. Thus, the reference density points of the gradation curve which is used for gradation conversion of the subject region are determined.

This allows the pixels which form the subject region to be left unremoved while the pixels which form the peripheral region are automatically removed from the pixels which form the data read region, making it possible to omit manual designation of the subject region by an operator.

Accordingly, an object of the present invention is to offer an image signal conversion apparatus which omits manual designation of a subject region by an operator by utilizing a fact that densities about a peripheral region of the subject region of an original are concentrated at a particular density range. Hence, the image conversion apparatus of the present invention enables automatic conversion of an image signal.

These and other objects, features, aspects and advantages of the present invention will become more apparent from the following detailed description of the present invention when taken in conjunction with the accompanying drawings.

DESCRIPTION OF THE PREFERRED EMBODIMENTS

Image signal conversion apparatuses according to preferred embodiments of the present invention will be described in the following paragraphs with reference to the drawings. Needless to mention, the preferred embodiments are not intended to limit the present invention in any regard.

<First Preferred Embodiment>

Figure 2:
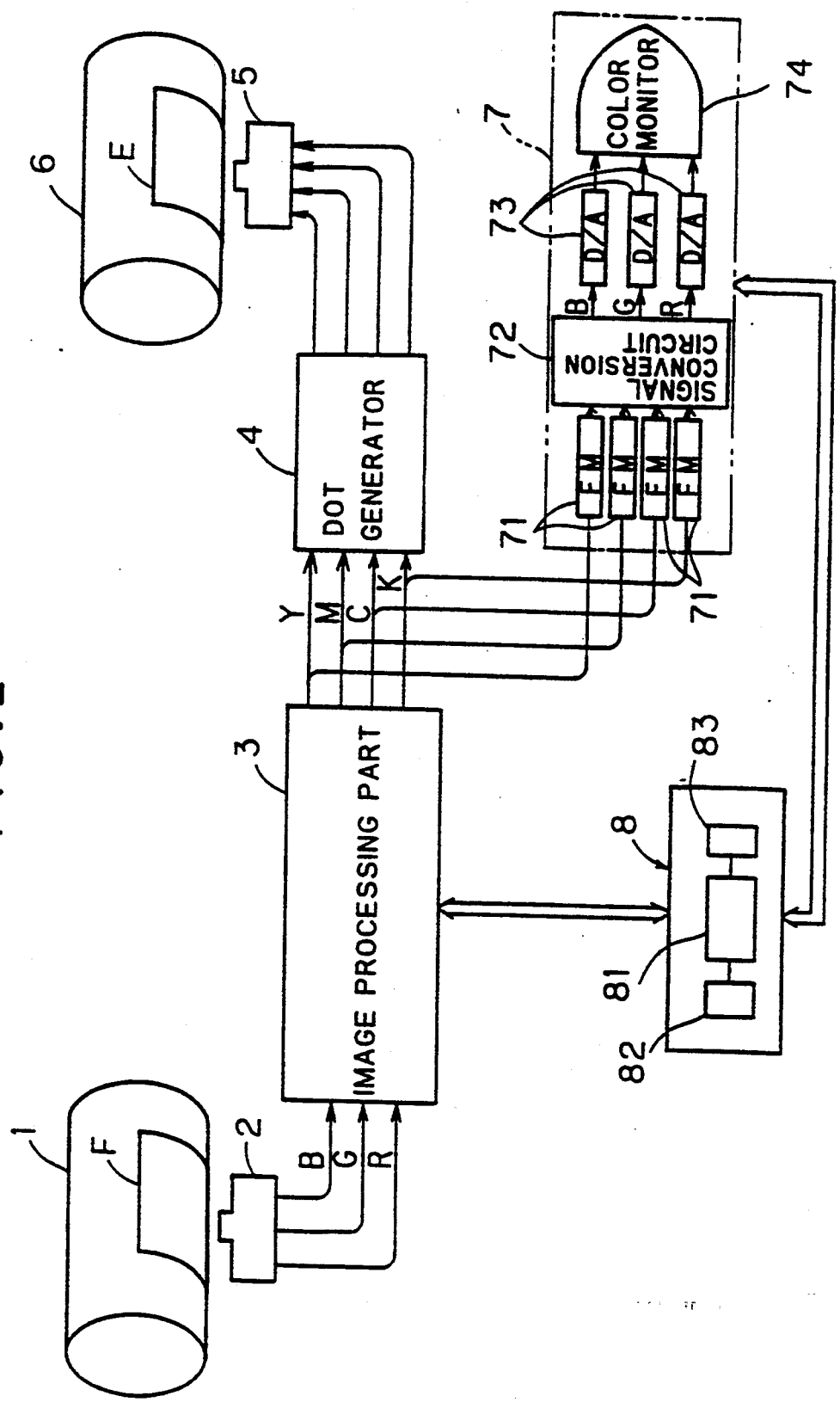
FIG. 2 is a schematic block diagram showing the structure of a color process scanner to which the first preferred embodiment of the present invention is applied.

FIG. 2 is a schematic block diagram of a color process scanner to which a first preferred embodiment of the present invention is applied.

In this color process scanner, a scan/read head 2 reads an image signal of a color original F such as a color film which is wound on an input cylinder 1. In accordance with the image signal read by the scan/read head 2, halftone dot images of the respective color components are formed on a photosensitive material E which is wound around an output cylinder 6. In addition to the input cylinder 1, the scan/read head 2 and the output cylinder 6, the color process scanner includes an image processing part 3, a dot generator 4, a scan/record head 5, a display device 7 for displaying a gradation-converted image, and an information processing part 8.

Figure 5A:
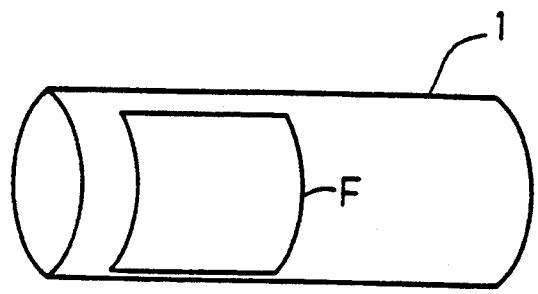
FIGS. 5A and 5B are views showing a color original as it is mounted on an input cylinder.
Figure 5B:
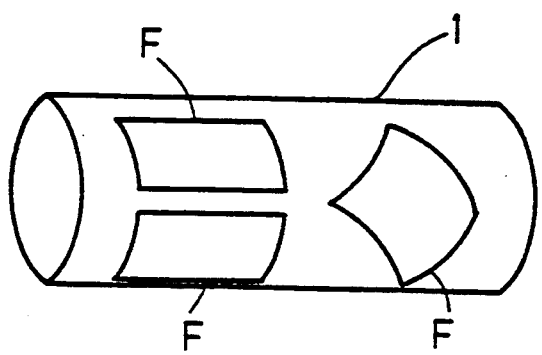

The input cylinder 1 is made of transparent plastic since the color original F is transparent in most cases. The color original F to be wound on the input cylinder 1 may be a reversal positive film or a negative film. As shown in FIG. 5A, the input cylinder 1 may mount only one color original F, or the input cylinder 1 may mount a plurality of color originals F as shown in FIG. 5B. Mounting a plurality of color originals F would not cause a problem in actual processing since the color originals F used in the present invention are of the same type.

Figure 3:
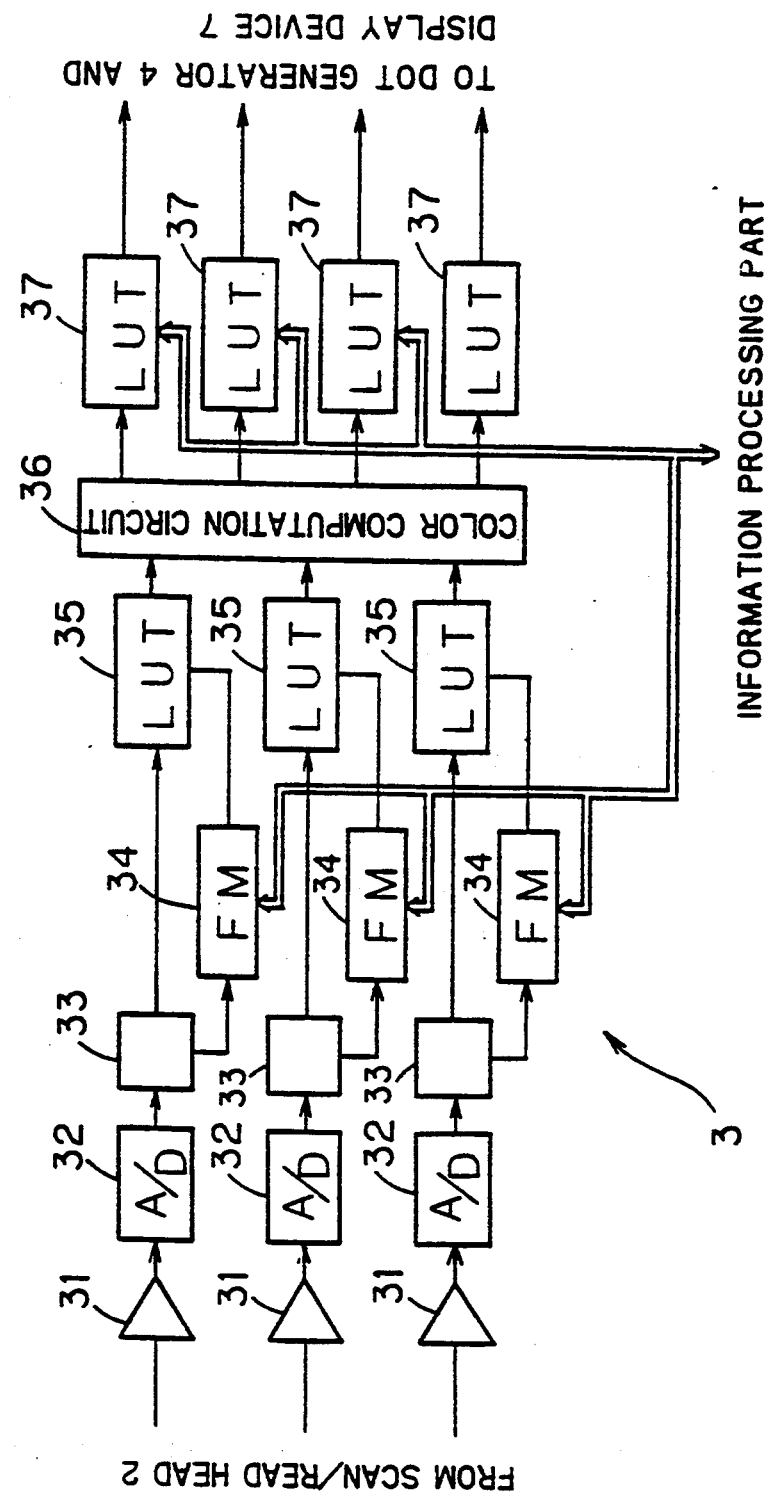
FIG. 3 is a schematic view showing the structure of an image processing part of the color process scanner of FIG. 2.

The scan/read head 2 is a known scan/read head which moves along the axis of the input cylinder 1 opposed to said input cylinder 1 which is in high-speed rotation and which consequently reads each pixel of an image located within the scanning range of the scan/read head 2. That is, the scan/read head 2 sweeps the surface of said input cylinder 1 including the color original F and generates input image data for the respective color components B, G and R. The input image data are fed to the image processing part 3. The image processing part 3, constructed as a signal convertor, comprises logarithm conversion circuits 31, A/D convertors 32, switch circuits 33, first frame memories 34, first look-up tables 35, color computation circuits 36 and second look-up tables 37 as shown in FIG. 3.

The input image data are processed regarding each of the color components B, G and R as follows.

The logarithm conversion circuit 31 converts by logarithmic conversion the image data read by the scan/read head 2 so that analog density signals are obtained which are in proportion to a voltage. The A/D convertor 32 converts the analog density signals into digital input density signals.

The switch circuit 33 switches the flow of data depending on prescanning for setting up a gradation curve as signal conversion characteristics and scanning for generating a reproduced image. During prescanning, the switch circuit 33 connects said A/D convertor 32 to the first frame memory 34. During scanning, the switch circuit 33 connects said A/D convertor 32 to the first look-up table 35.

The first frame memory 34 stores therein the input density signals which are received through said switch circuit 33. The input density signals stored in the first frame memory 34 are fed to the first look-up table 35 described later, and if necessary, to the information processing part 8.

Figure 6:
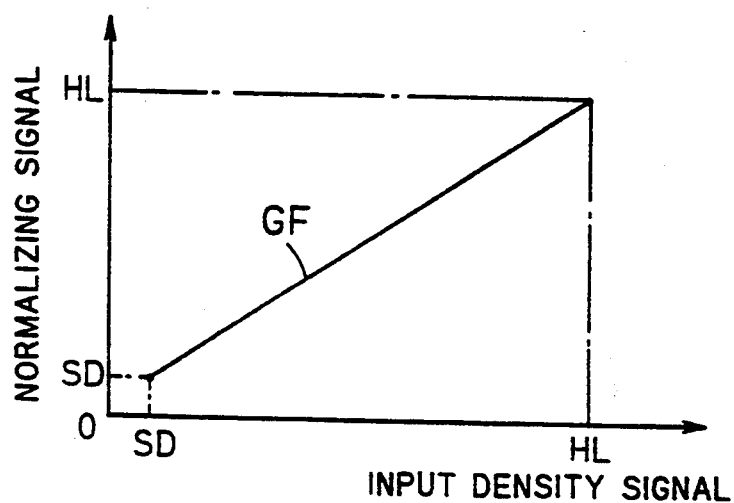
FIG. 6 is a view showing a normalizing function to be set up in a first look-up table.

A predetermined normalizing function GF regarding the density signals as that shown in FIG. 6 is set in the first look-up table 35. In other words, the first look-up table 35 is to normalize the ranges of said input density signals regarding the respective color components B, G and R in accordance with the predetermined normalizing function GF. Normalization of the density signals within the first look-up table 35 is realized by setting the shadow points SD of the input density signals to a predetermined reference voltage. As the shadow points SD, standard values are initially selected.

The color computation circuit 36 converts the digital input density signals normalized by the first look-up table 35 which are in the form of density signals regarding the color component B, G or R into density signals regarding the color component Y, M, C or K. The density signals from the color computation circuit 36 are supplied to the second look-up table 37.

A gradation curve for gradation conversion of the density signals regarding the color component Y, M, C or K is set up in the second look-up table 37. A gradation curve set up in the second look-up table 37 prior to prescanning is a gradation curve with standard characteristics which passes through preliminarily established standard shadow and highlight points. A gradation curve set up in the second look-up table 37 after prescanning is a gradation curve which passes through the reference points (shadow and highlight points) on a density conversion coordinate plane found by the information processing part 8 based on the input image data generated by prescanning (described later). The shadow and highlight points of the gradation curve, or the characteristics of the gradation curve, set up in the second look-up table 37 can be adjusted by the information processing part 8. The density signals regarding the color component Y, M, C or K gradation-converted by the second look-up table 37 are supplied to the dot generator 4.

The dot generator 4 converts outputs of the image processing part 3, i.e., the density signals regarding the color component Y, M, C or K outputted from the second look-up table 37, into halftone dot signals which will be then fed to the scan/record head 5.

The scan/record head 5 moves along the axis of said output cylinder 6 in accordance with said halftone dot signals, thereby recording a halftone dot image on the photosensitive material E which is wound on said output cylinder 6 which is in high-speed rotational movement.

The display device 7 for displaying a gradation-converted image includes a second frame memory 71, a signal conversion circuit 72, a D/A convertor 73 and a color monitor 74. The second frame memory 71 stores therein the density signals regarding the color component Y, M, C or K received from the image processing part 3. The density signals stored in the second frame memory 71 are retrieved when needed. The density signals are then converted into signals regarding the color component B, G or R by the signal conversion circuit 72 and further converted into analog signals by the D/A convertor 73, making it possible that an image converted for reproduction in the second look-up table 37 is displayed on the color monitor 74 such as a CRT display.

Figure 4:
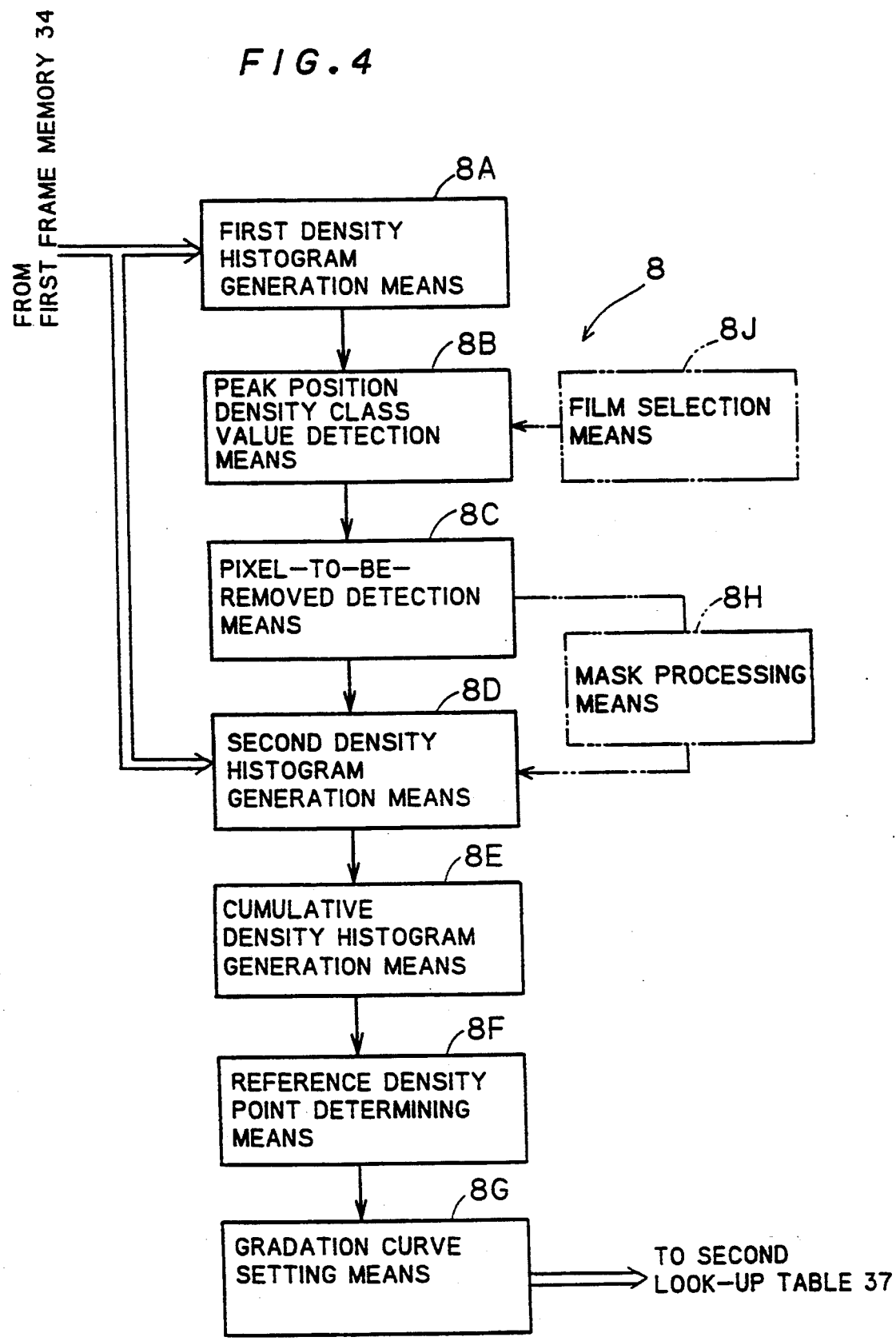
FIG. 4 is a schematic view showing the structure of an information processing part of the color process scanner of FIG. 2.

As shown in FIG. 4, the information processing part 8 includes a first density histogram generation means 8A, a peak position density rank value detection means 8B, a pixel-to-be-removed detection means 8C, a second density histogram generation means 8D, a cumulative density histogram generation means 8E, a reference density point determining means 8F and a gradation curve setter 8G. The means 8A to 8G are formed by a CPU 81 and a console 82 and a memory 83 which are connected to the CPU 81 (See FIG. 2).

Figure 7A:
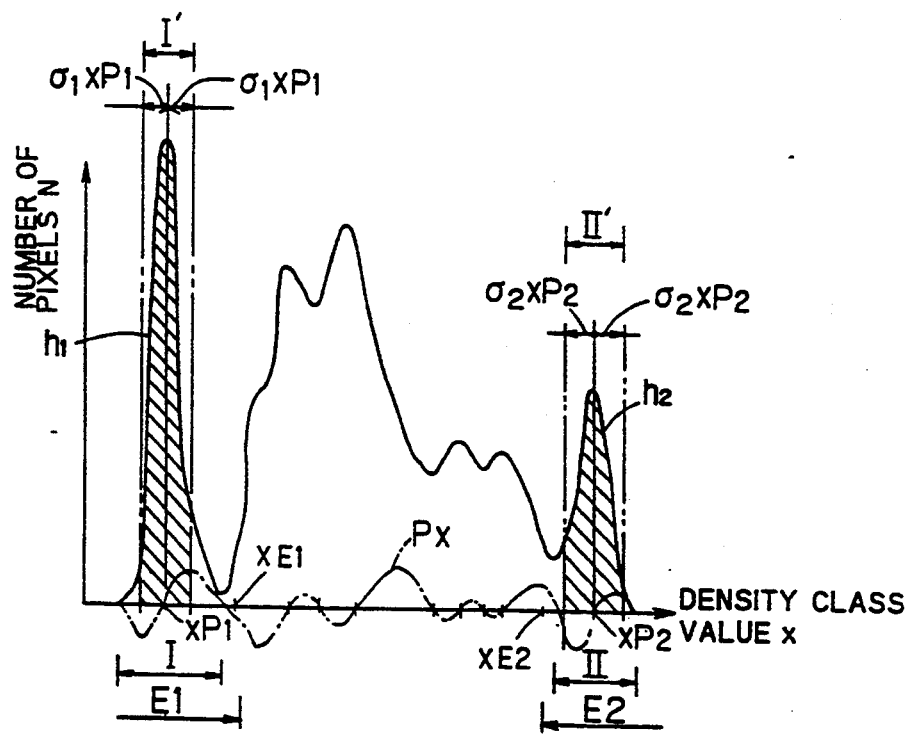
FIGS. 7A and 7B are views each showing a first density histogram.
Figure 7B:
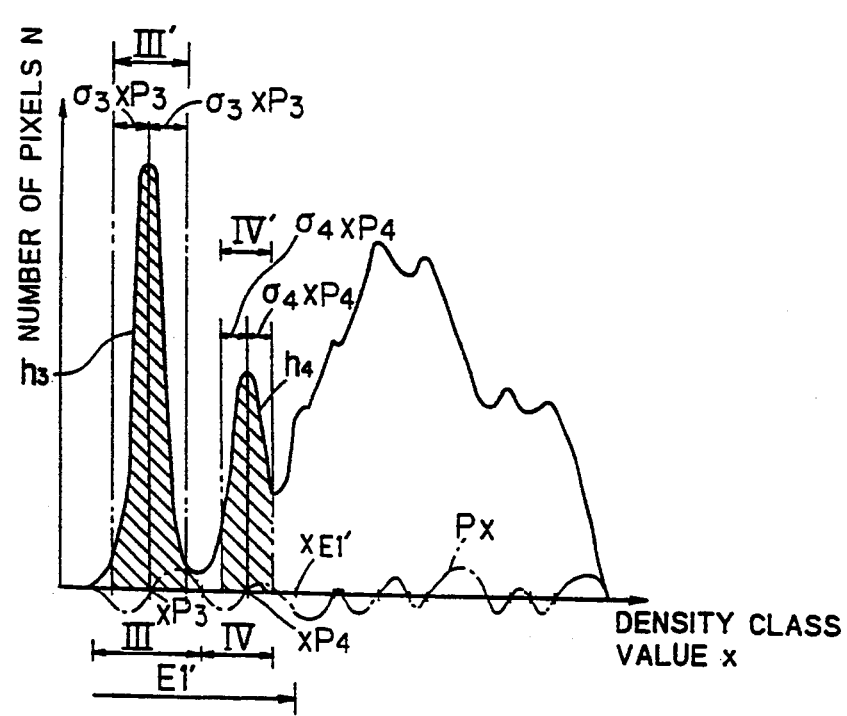

The first density histogram generation means 8A reads the input density signals for the respective color components R, G and B which are stored in the first frame memories 34 and calculates an average density for the color components R, G and B with respect to -every pixel based on these input density signals. A first density histogram such as that shown in FIG. 7A or FIG. 7B is then developed which shows a relation between the average density and the number of pixels by which the average density is known. The density rank having a predetermined density range is taken along the axis of the of abscissa of the graph. The number of pixels average densities of which belong to the density rank is taken along the axis of the ordinate of the graph. As to the density rank value x, a mean density value of each density rank is shown as a representative density values.

In the case where the color original F mounted on said input cylinder 1 is a reversal positive film, the first density histogram generated by the first density histogram generation means 8A exhibits a pixel distribution which includes surge portions h1 and h2, which show concentration of the pixels, respectively, at the density ranges I and II at both ends of the graph, as shown in FIG. 7A. The density range I is a density range of image data of a no-original portion C (See FIG. 9A) in which the color original F is not present on the input cylinder 1, i.e., image data about the transparent plastic surface. The density range II is a density range of image data regarding a periphery D of the color original F (See FIG. 9A).

Opposite to this, when the color original F wound around the input cylinder 1 is a negative film, the first density histogram generated by the first density histogram generation means 8A exhibits a pixel distribution which includes surge portions h3 and h4, which show concentration of the pixels, respectively, at the density ranges III and IV at a lower density end of the graph, as shown in FIG. 7B. Exactly the same as the case shown in FIG. 7A, the density range III is a density range of image data regarding the no-original portion C in which the color original F is not present on the input cylinder 1. On the other hand, the density range IV is a density range of image data regarding strip-like shape margins which are provided at both edges of the subject region of the negative film and in which holes for reeling the negative film are formed.

The peak position density rank value detection means 8B calculates peak position density rank values xP which correspond to all of the peaks of the pixel distribution surge portions of the first density histograms shown in FIGS. 7A and 7B. The peak position density rank values xP are computed in the following manner.

First, a peak frequency Px is calculated in accordance with Eq. 1 for each density rank value x:

$$Px = x - \frac{\sum_{i=x-d}^{i=x+d} (Ni \cdot i)}{\sum_{i=x-d}^{i=x+d} Ni} \quad (1)$$

where i is a range of the density rank values which is defined by Eq. 2 regarding the density rank value x for which the peak frequency Px is calculated.

$$x-d \leq i \leq x+d \quad (2)$$

where d is a properly determined constant. When the constant d is set at a large value, two or more peak position density values could be included in the range i of said density rank values, in which case correct detection of the peak position density rank values xP cannot be attained. On the other hand, when the constant d is set at too small a value, even if certain density rank value x is a peak position density rank value xP, if the distribution is imbalanced near the both sides of that density rank value x, the peak position density rank value xP cannot be detected. Hence, the constant d must be set at a value with which the pixel distribution surge portions h1, h2 or h3, h4, which appear at the density ranges I, II or III, IV, are each regarded as having an approximately normal distribution in the range i. A result of experiments shows that the constant d is preferably set at a value which corresponds to a density of about 0.06.

Plotting the peak frequency Px calculated based on Eq. 1, single dot lines as those shown in FIGS. 7A and 7B are obtained each showing that the peak frequency Px crosses at the "0" level at the peak position density values. That is, the peak frequency Px is "0" or "a value approximate to 0" when the density rank value x is a peak position density rank value xP. When the density rank value is completely the same as a peak position density rank value xP, the peak frequency Px=0.

However, since the density rank value x merely represents a representative value of each density rank, the density rank value x does not necessarily coincide with a true peak position density value. Therefore, when the density rank value x does not coincide with a true peak position density value, further, when a distribution around a peak position density rank value xP does not form a normal distribution, the peak frequency Px does not become zero. Hence, when the absolute value of a peak frequency Px is smaller than both the absolute value of a peak frequency P(x−1) of a precedent density rank value (x−1) and a peak frequency P(x+1) of a next density rank value (x+1), the density rank value x which gives the peak frequency Px is regarded as a peak position density rank value xP. In other words, in order that the density rank value x is considered to be a peak position density rank value xP, Eq. 3 as below must be satisfied:

$$|px| < |P(x+1)| \text{ and } |Px| < |P(x-1)| \quad (3)$$

If the peak position density rank value xP is a peak position density rank value xP of a surge portion of the first density histogram, a peak frequency P(xP+1) of a next density rank value (xP+1) is greater than "0." On the other hand, if the peak position density rank value xP is a peak position density rank value xP of a valley portion of the first density histogram, the peak frequency P(xP+1) of the next density rank value (xP+1) is smaller than "0." That is, when Eq. 4 below is satisfied, the density rank value x is equal to a peak position density rank value xP of a surge portion.

$$P(xP+1) > 0 \quad (4)$$

Following this, the second density histogram generation means 8B judges whether the peak position density rank value xP of a surge portion satisfying Eq. 4 is within a detection density range. The detection density range is set such that the detection density range does not overlap the density range of a subject region of an ordinary color original F and even if overlaps, an overlapping portion is minimum. In the case of FIG. 7A described above, a first detection density range E1 with a maximum density xE1 as a boundary density is set at a lower density side while a second detection density range E2 with a minimum density xE2 as a boundary density is set at a higher density side. In other words, when the color original F is a reversal positive film, the peak position density rank value xP of a surge portion to be detected must satisfy Eq. 5:

$$xP < xE1 \text{ or } xP > xE2 \ldots (xE2 > xE1) \quad (5)$$

On the other hand, in the case of FIG. 7B, only a third detection density range E1' with a maximum density xE1' as a boundary density is set at the lower density side. In short, when the color original F is a negative film, the peak position density rank value xP of a surge portion to be detected must satisfy Eq. 6:

$$xP < xE1' \quad (6)$$

Further, from the peak position density rank values xP which satisfy Eqs. 5 and 6, a peak position density rank value xP which satisfies a predetermined condition is selected by the second density histogram generation means 8B. For Eq. 5, the conditions (a) or (b) must be satisfied and for Eq. 6, the condition (c) must be satisfied.

(a) The lowest peak position density rank value xP1 of the first detection density range E1.

(b) The highest peak position density rank value xP2 of the second detection density range E2.

(c) The lowest and the second lowest peak position density rank values xP3 and xP4 of the third detection density range E1'.

The peak position density rank value detection means 8B outputs the above-mentioned peak position density rank values xP1, xP2 or xP3, xP4 to the pixel-to-be-removed detection means 8C as detected peak position density rank values.

The pixel-to-be-removed detection means 8C calculates pixel removal density ranges which have the peak position density rank values xP1, xP2 or xP3, xP4, which were detected by the peak position density rank value detection means 8B, as a center. The pixel-to-be-removed detection means 8C then outputs pixels having average densities which are included in the pixel removal density range as pixels-to-be-removed. By finding a dispersion value a σ·xP around the peak position density rank value xP in accordance with Eq. 7, the pixel removal density range is defined by Eq. 8:

$$(\sigma \cdot xP)^2 = \left[ \sum_{i=xP-d}^{i=xP+d} \{Ni \cdot (i - xP)^2\} \right] / \{\Sigma Ni\} \quad (7)$$

Pixel removal density range $= xP \pm \sigma \cdot xP$ (8)

That is, Eq. 9 below defines a pixel removal density range I' around the peak position density rank value xP1, a pixel removal density range II' around the peak position density rank value xP2, a pixel removal density range III' around the peak position density rank value xP3 and a pixel removal density range IV' around the peak position density rank value xP4.

$$xP1 - \sigma 1 \cdot xP1 \leq I' \leq xP + \sigma 1 \cdot xP1$$

$$xP2 - \sigma 2 \cdot xP2 \leq II' \leq xP2 + \sigma 2 \cdot xP2$$

$$xP3 - \sigma 3 \cdot xP3 \leq III' \leq xP3 + \sigma 3 \cdot xP3$$

$$xP4 - \sigma 4 \cdot xP4 \leq IV' \leq xP4 + \sigma 4 \cdot xP4 \quad (9)$$

Pixels which correspond to the pixel removal density ranges I', II', III' and IV' determined by Eq. 9, i.e., the pixels-to-be-removed are pixels which are included in the portions shadowed with oblique lines in FIG. 7A or 7B. The pixel-to-be-removed detection means 8C then provides the second density histogram generation means 8D with information about the pixels-to-be-removed.

The second density histogram generation means 8D removes the pixels-to-be-removed found by the pixel-to-be-removed detection means 8C from all the pixels read from the first frame memories 34 and calculates an average density for the color components R, G and B with respect to each one of the pixels which remain unremoved. The second density histogram generation means 8D then generates a second density histogram with the density rank having a predetermined density range taken along the axis of the abscissa of the graph and the number of pixels having average densities which belong to the density rank taken along the axis of the ordinate of the graph.

The second density histogram thus developed is equal to the first density histogram of FIG. 7A or 7B as it would be if the shadowed portions are removed therefrom.

Figure 20:
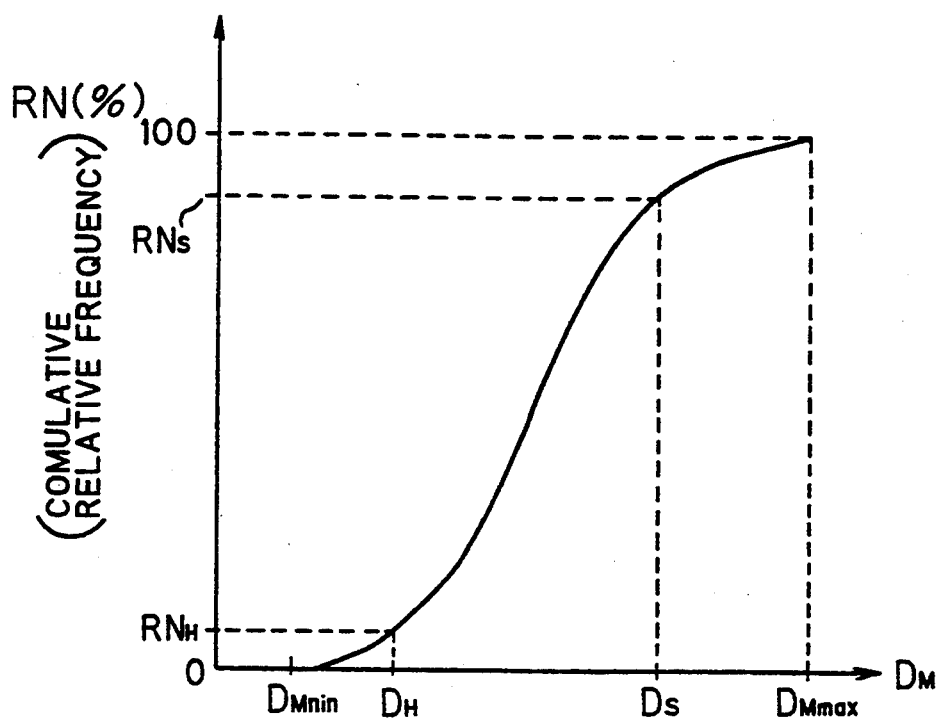
FIG. 20 is a view showing a cumulative density histogram which is necessary for generating the gradation curve.

The cumulative density histogram generation means 8E accumulates pixel appearance frequencies for the respective density rank values x of the second density histogram in an increasing order of the density rank values x to thereby generate a cumulative density histogram. In this case, a cumulative relative frequency histogram which is similar to that shown in FIG. 20 is generated which shows a cumulative value of the appearance frequencies as a relative frequency. The cumulative relative frequency histogram developed in this manner is used as a cumulative frequency histogram.

The reference density point determining means 8F applies cumulative relative frequencies RNH and RNS, which have been found in advance to find an optimum highlight density DH and an optimum shadow density DS, to the cumulative relative frequency histogram in order to find a highlight density DH and a shadow density DS which correspond to the cumulative relative frequencies RNH and RNS. Next, halftone-dot area rates which correspond to the highlight and the shadow densities DH and DS are set and the highlight point HL and the shadow point SD are determined and serve as reference density points of a gradation curve on the gradation conversion coordinate plane (FIG. 21).

Figure 21:
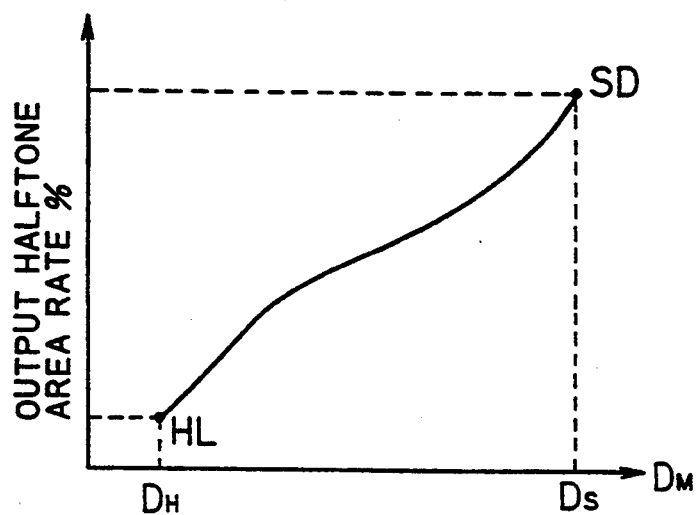
FIG. 21 is an explanatory diagram of the gradation curve.

The gradation curve setting means 8G then determines a gradation curve as that shown in FIG. 21 which passes through the highlight point HL and the shadow point SD.

The method for establishing a gradation curve based on the second density histogram is described in U.S. Pat. No. 4,792,979 mentioned earlier and U.S. Pat. No. 4,984,071 disclosed also by the inventor of the present invention.

Figure 1:
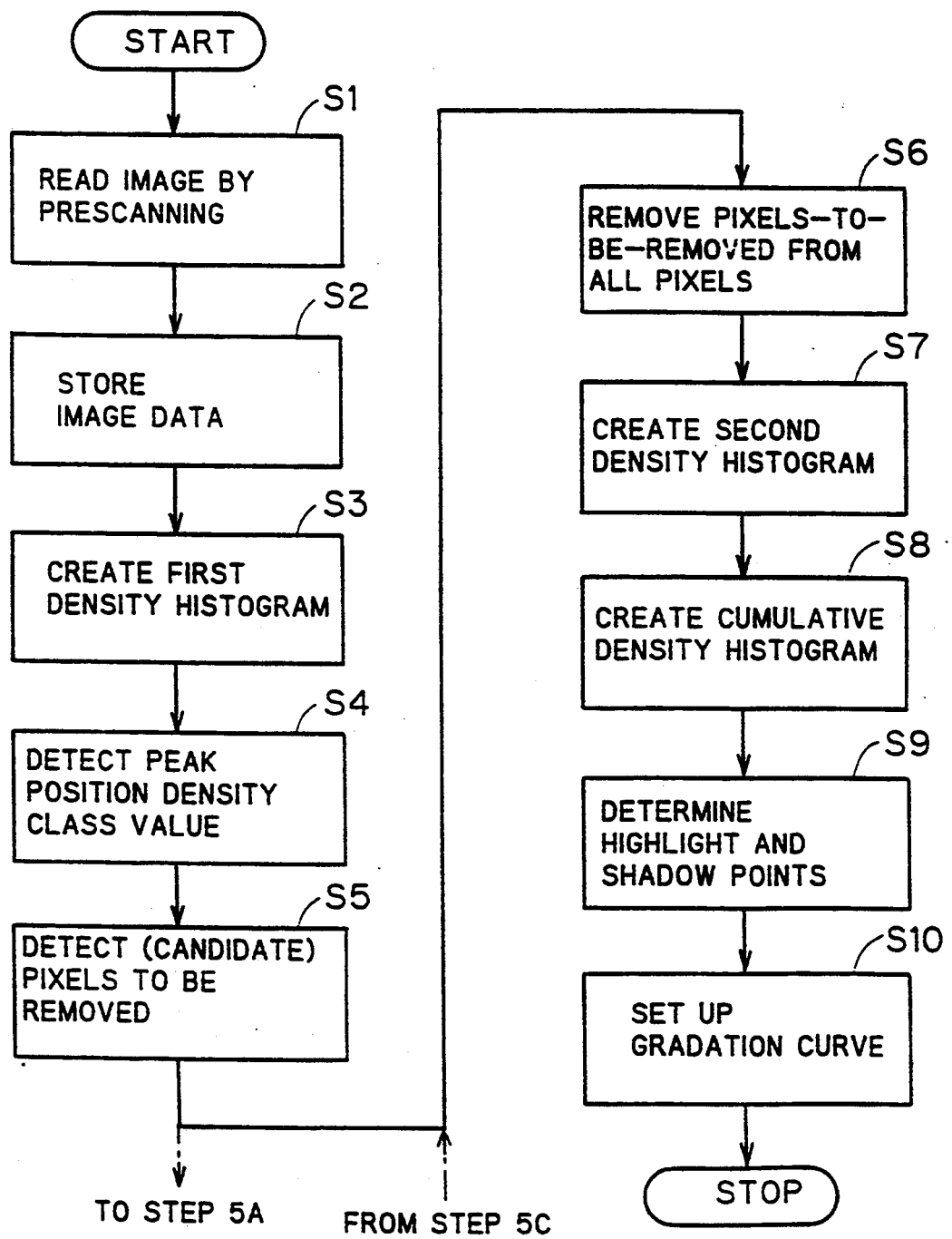
FIG. 1 is a flow chart for explaining a method of establishing a gradation conversion curve according to a first preferred embodiment of the present invention.

FIG. 1 is a flow chart for explaining a method of establishing reference density points by the above-mentioned color process scanner.

First, at a step S1, by prescanning, the image of the color original F, i.e., a target object, which is wound on the input cylinder 1 is read, simultaneously with which the image of a peripheral region on the periphery of the color original F is read.

At a step S2, the image data read at the step S1 are stored in the first frame memories 34.

Next, at a step S3, the first density histogram generation means 8A reads the image data from said first frame memories 34. Based on the image data, the first density histogram such as that shown in FIG. 7A or 7B is generated.

Next, at a step S4, the peak position density rank value detection means 8B detects, in the first density histogram generated at the step S3, the peak position density rank values $xP1$, $xP2$ or $xP3$, $xP4$ which are within the detection density ranges $E1$, $E2$ or $E1'$, respectively, and which satisfy the conditions (a), (b) or (c), respectively.

Next, at a step S5, the pixel-to-be-removed detection means 8C determines the pixel removal density ranges $I'$, $II'$ or $III'$, $IV'$ which correspond to the peak position density rank values $xP1$, $xP2$ or $xP3$, $xP4$, and pixels having average densities which belong to the pixel removal density ranges $I'$, $II'$ or $III'$, $IV'$ are determined as pixels-to-be-removed.

At a step S6, the pixels-to-be-removed are removed from all pixels which correspond to the image data read from the first frame memories 34.

At a step S7, using an average density with respect to each one of the pixels which remain after removal of the pixels-to-be-removed, the second density histogram is generated which shows a relation between the average density value and the number of the pixels defining the average density value.

At a step S8, from the second density histogram generated at the step S7, the cumulative density histogram is developed.

At a step S9, the cumulative relative frequencies RNH and RNS, which have been found in advance to find an optimum highlight density DH and an optimum shadow density DS, are applied to the cumulative relative frequency histogram, and the highlight density HL and the shadow density SD are found which will be used as the reference density points on the gradation conversion coordinate plane.

Following this, at a step S10, the gradation curve passing through the highlight point HL and the shadow point SD is established.

The characteristics of the gradation curve established in this manner are set up in the second look-up table 37.

The scan/read head 2 then scans the original image to generate an image signal which will be thereafter gradation-converted into an image signal in accordance with the gradation curve which is set up in the second look-up table 37. The gradation-converted image signal is converted by the dot generator 4 into a halftone dot signal in accordance with which a halftone dot image is recorded on the photosensitive material E which is wound on the output cylinder 6, thereby a reproduced image is reproduced thereon.

<Mask Processing in First Preferred Embodiment>

Figure 8:
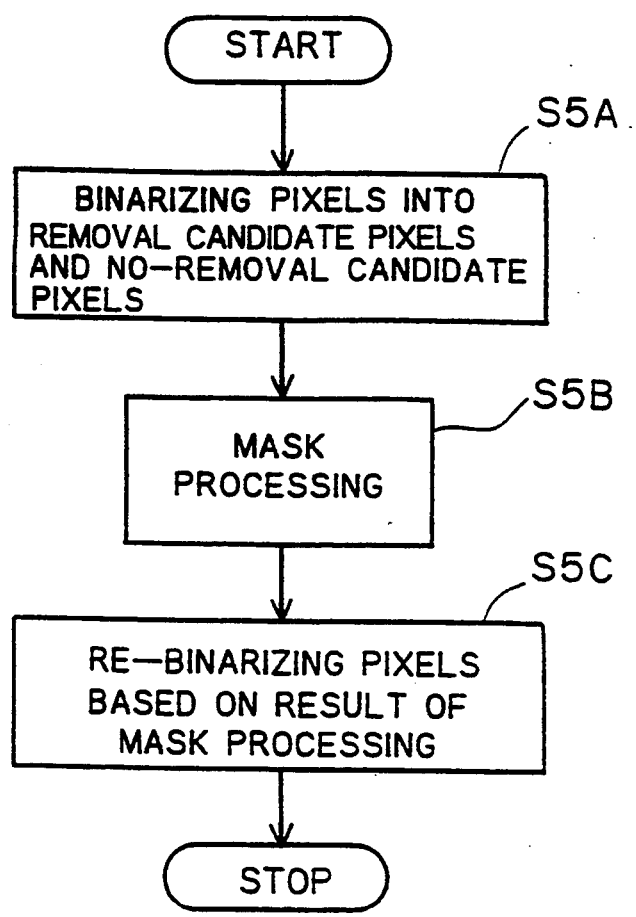
FIG. 8 is a flow chart for explaining mask processing in the first preferred embodiment.

Steps S5A to S5C shown in FIG. 8 are a routine which is to be carried out between the steps S5 and S6 of FIG. 1 in other preferred embodiments of the present invention. In a preferred embodiment which require execution of the steps S5A to S5C, the pixels included in the pixel removal density ranges $I'$, $II'$ or $III'$, $IV'$ which are found in the step S5 in the precedent embodiment are not used as pixels to be removed. Instead, these pixels are used as removal candidate pixels in proceeding to the step S5A.

Figure 9A:
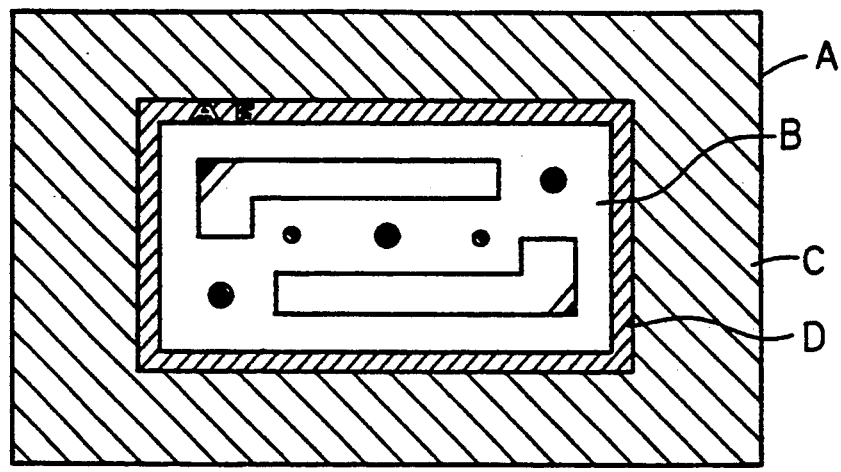
FIGS. 9A to 9C are views for explaining the procedures for determining pixels which are to be removed by the mask processing.
Figure 9B:
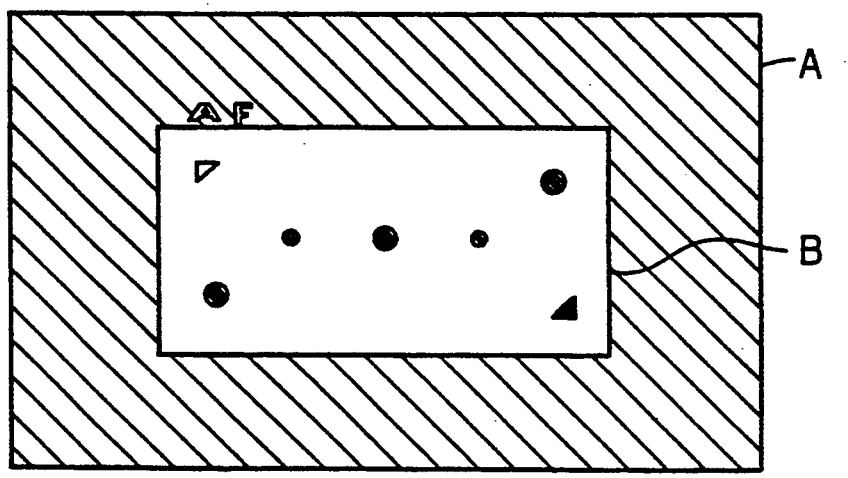
Figure 10A:
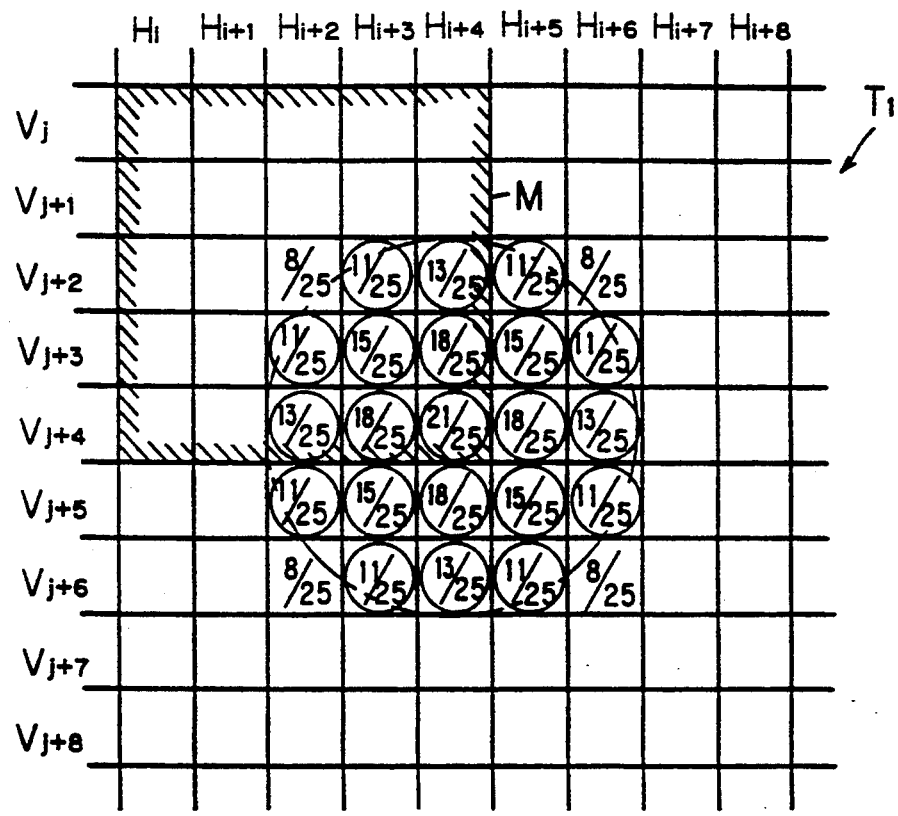
FIGS. 10A and 10B are views for explaining the procedures for shading off an binary image by the mask processing.
Figure 10B:
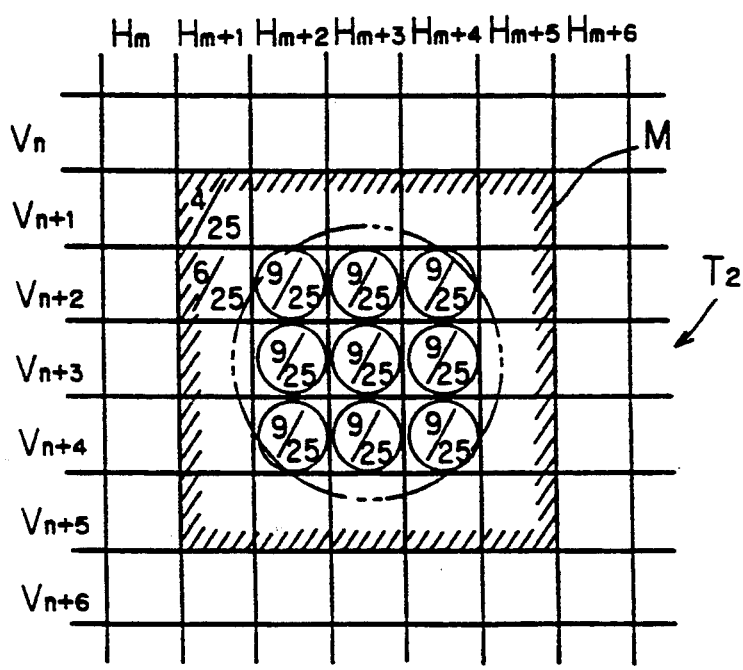

In the step S5A, based on the data about all pixels of a data read region A read from the first frame memories 34, all pixels are divided into the removal candidate pixels and pixels otherwise, i.e., no-removal candidate pixels, whereby the pixels are binarized. If a data read region A such as that shown in FIG. 9A is binarized into the removal candidate pixels and the no-removal candidate pixels, a binary image is obtained as shown in FIG. 9B, for example, in which a portion formed by the no-removal candidate pixels is shadowed with oblique lines. FIG. 10A shows an image region T1 which is formed by 81 pixels, i.e., pixels Hi to Hi+8 by pixels Vj to Vj+8 while FIG. 10B shows an image region T2 which is formed by 49 pixels, i.e., pixels Hm to Hm+6 by pixels Vn to Vn+6. In FIGS. 10A and 10B, binary "1" removal candidate pixels are encircled and binary "0" removal candidate pixels are not encircled.

In the step S5B, a mask is created which encloses an odd number of pixels in the form of a matrix in which an equal number of pixels are arranged in vertical and horizontal directions, and average binary value of the pixels enclosed by the mask is calculated. The binary value of a center pixel within the mask is replaced with the average binary value which is calculated in the manner above (hereinafter "mask processing").

An example of this is shown in FIGS. 10A and 10B wherein of the pixels enclosed by a mask M which covers 5×5 pixels, the binary value of a pixel which is located at a center is replaced with an average binary value of the binary values of 25 pixels which are covered by the mask M.

As shown in FIG. 10A, where 21 removal candidate pixels are concentrated in a center portion of the image region T1 (that is, a region of Hi+2 to Hi+6 pixels by Vj+2 to Vj+6 pixels), if the mask M is located at a region, of Hi to Hi+4 pixels by Vj to Vj+4 pixels, eight circles, that is, eight binary "1" removal candidate pixels are included in the mask M. Hence, an average value of the binary values is 8/25, and therefore, the value of Hi+2×Vj+2 pixel, the central pixel of the mask M, is replaced with 8/25. By replacing the value of the central pixel of the mask M with an average value of the binary values of the pixels enclosed by the mask M while moving the mask M, i.e., by executing the mask processing, the binary values of the 21 removal candidate pixels of the range of Hi to Hi+4 pixels by Vj to Vj+4 pixels are replaced with 11/25 to 21/25 as shown in FIG. 10A.

As shown in FIG. 10B, where 9 removal candidate pixels are concentrated in a center portion of said image region T2 (that is, a range of Hm+2 to Hm+4 pixels by Vn+2 to Vn+4 pixels), by the above-mentioned mask processing using the mask M, the binary values of the 9 removal candidate pixels in the range of Hm+2 to Hm+4 pixels by Vn+2 to Vn+4 pixels are all replaced with 9/25 as shown in FIG. 10B.

Figure 9C:
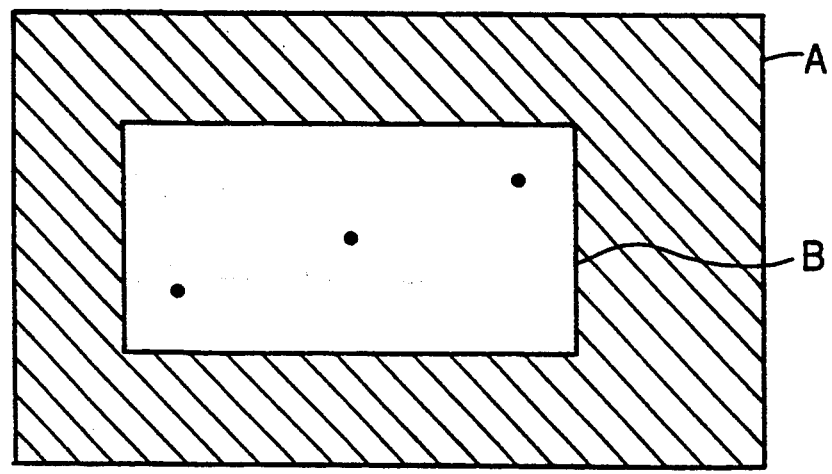

Next, in the step S5C, the binary values of the respective pixels processed at the step S5B are once again binarized using a predetermined threshold value, thereby determining pixels-to-be-removed. For instance, if the threshold value is set at 20/25 in the case of FIG. 10A, of the pixels having an average binary value of 21/25, only Hi+4×Vj+4 pixel is determined as the pixel-to-be-removed. If the threshold value is set at 16/25, Hi+3×Vj+4 pixel and Hi+4×Vj+3 to Vj+5 pixels, i.e., 5 pixels in total, are determined as the pixels-to-be-removed. FIG. 9C shows an image obtainable from the binary image of FIG. 9B after the mask processing and subsequent re-binarizing.

In this preferred embodiment, determination of the pixels-to-be-removed at the, step S5C above is followed by the step S6 of FIG. 1 in which the pixels-to-be-removed found at the step S5C are removed from all the pixels read from the first frame memories 34.

The mask processing means 8H for executing the routine of the steps S5A to S5C above is disposed in the information processing part 8 as shown by the double dot line in FIG. 4. By carrying out the inserted routine of the steps S5A to S5C, the removal candidate pixels isolated in the no-removal candidate pixels can be removed from the pixels-to-be-removed which are determined at the step S6. It is also possible that the no-removal candidate pixels isolated the removal candidate pixels are included in the pixels-to-be-removed which are determined at the step S6, on the contrary to this. That is, even if the removal candidate pixels are present within the subject region, some or all of the removal candidate pixels can be used in generating the density histogram at the step S7. In addition, even if the subject region includes the no-removal candidate pixels because of a character or the like in the unexposed portion of a film, some or all of the no-removal candidate pixels can be excluded from pixels which are used in generating the second density histogram at the step S7. Hence, more accurate analysis is possible by carrying out the inserted routine of the steps S5A to S5C above.

An operator inputs the type of the color original F (i.e., whether the color original F is a reversal positive film or a negative film) in a film selection means 8J shown by the double dot line in FIG. 4. In accordance with the instruction entered in the film selection means 8J, the respective procedures are executed to be adaptive to the film type.

<Second Preferred Embodiment>

Next, a second preferred embodiment will be described. In the second preferred embodiment, even if the density of the subject region overlaps the density of the peripheral region surrounding the same, the pixels of the peripheral region are removed and the reference points are determined based on the pixels of the subject region, thereby conversion of an image signal is performed accurately.

Likewise the first preferred embodiment, the second preferred embodiment is realized with a process scanner which is similar to those shown in FIGS. 2 and 3. However, the second preferred embodiment departs from the first preferred embodiment in that the information processing part 8 of FIG. 1 has the following different construction.

Figure 12:
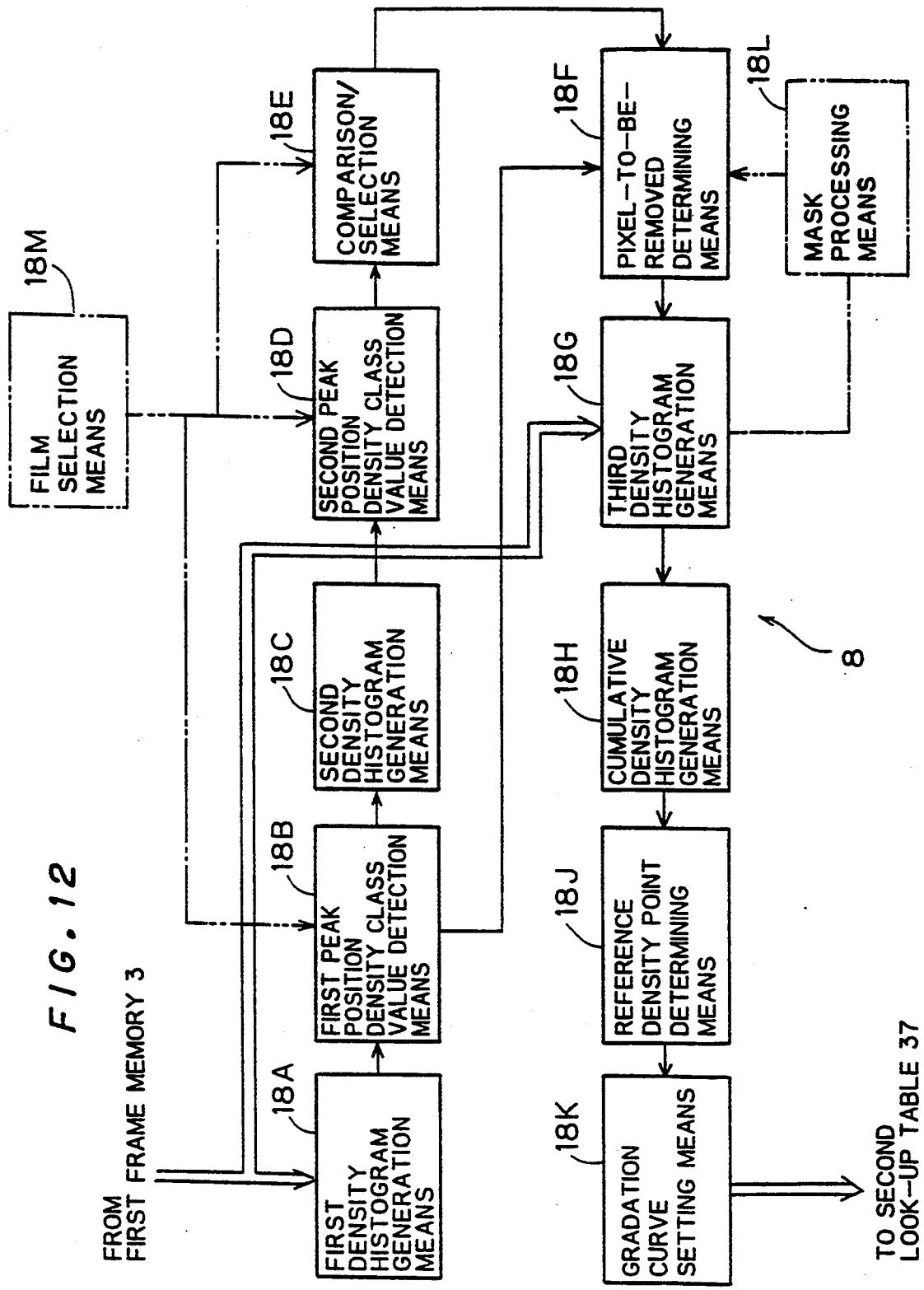
FIG. 12 is a schematic diagram showing the structure of a color process scanner to which the second preferred embodiment of the present invention is applied.

As shown in FIG. 12, the information processing part 8 includes a first density histogram generation means 18A, a first peak position density rank value detection means 18B, a second density histogram generation means 18C, a second peak position density rank value detection means 18D, a comparison/selection means 18E, a pixel-to-be-removed determining means 18F, a third density histogram generation means 18G, a cumulative density histogram generation means 18H, a reference density point determining means 18J and a gradation curve setting means 18K. The means 18A to 18K are formed by the CPU81 and the console 82 and the memory 83 which are connected to the CPU 81 (See FIG. 2).

The first density histogram generation means 18A reads the input density signals for the respective color components R, G and B which are stored in the first frame memories 34 and calculates an average density for the color components R, G and B with respect to every pixel based on these input density signals. A first density histogram such as those shown in FIGS. 13A, 14A, 15A and 16A is then developed which shows a relation between the average density and the number of pixels by which the average density is found. The density rank having a predetermined density range is taken along the axis of the abscissa of the graph. The number of pixels average densities of which belong to the density rank is taken along the axis of the ordinate of the graph. As to the density rank value x, a mean density value of each density rank is shown as a representative density value.

Figure 13A:
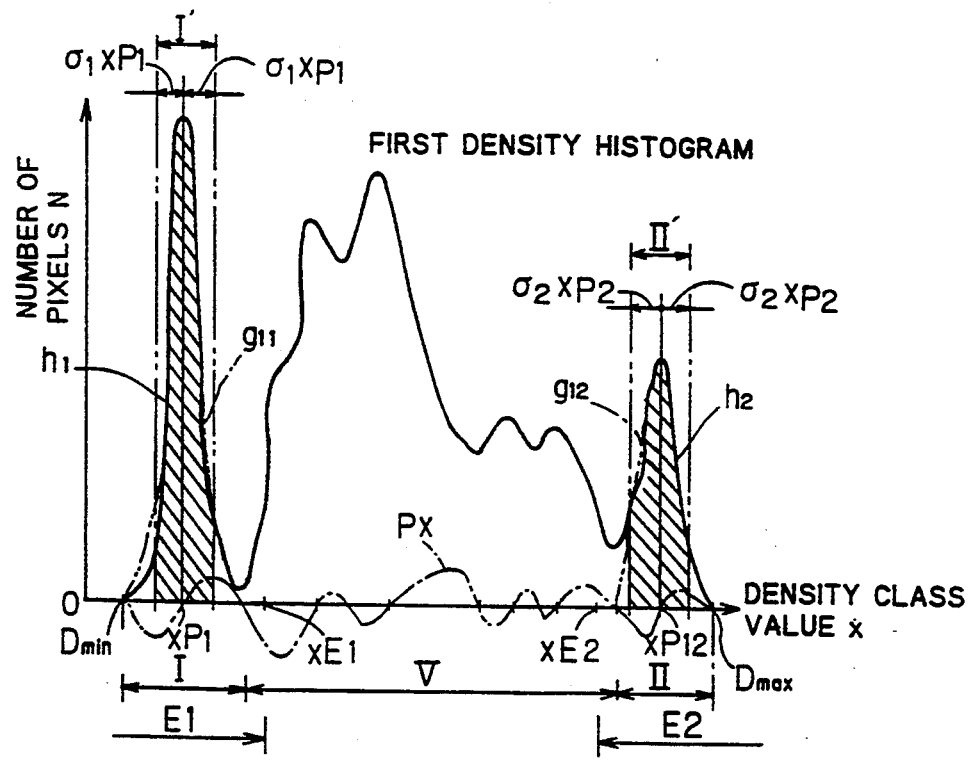
FIGS. 13A and 13B are views showing a first density histogram and a second density histogram, respectively, of where the original image is a reversal positive film.
Figure 14A:
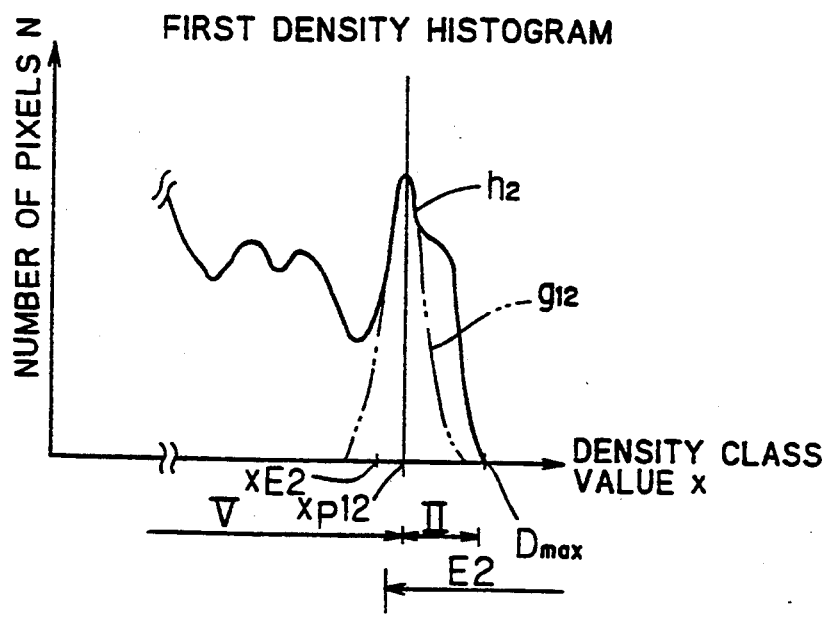
FIGS. 14A and 14B are views showing a first density histogram and a second density histogram, respectively, of where the original image is other type of reversal positive film.

In the case where the color original F mounted on said input cylinder 1 is a reversal positive film, the first density histogram generated by the first density histogram generation means 18A in general exhibits a pixel distribution which includes surge portions h1 and h2, which show concentration of the pixels, respectively at the density ranges I and II at both ends of the graph, as shown in FIG. 13A. The density range I is a density range of image data corresponding to a no-original portion in which the color original F is not present on the input cylinder 1, i.e., image data about the transparent plastic surface. The density range II is a density range of image data corresponding to a periphery of the color original F. Some type of the color original F has a density range near said density range II in a background portion of the subject region. If the color original F is such an original image, in some cases, as shown in FIG. 14A, the first density histogram includes a surge portion h2 which appears from the density range V of the subject region to said range II. In FIG. 14A, the lower density side surge portion h1 of FIG. 13A is omitted.

Figure 15A:
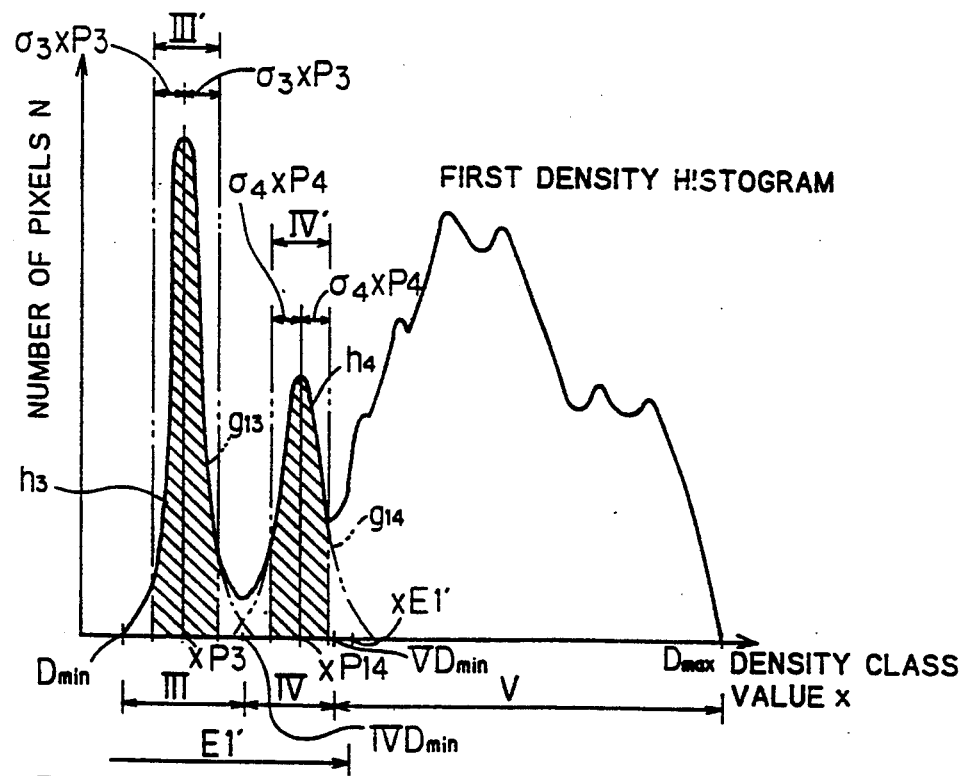
FIGS. 15A and 15B are views showing a first density histogram and a second density histogram, respectively, of where the original image is a negative film.
Figure 16A:
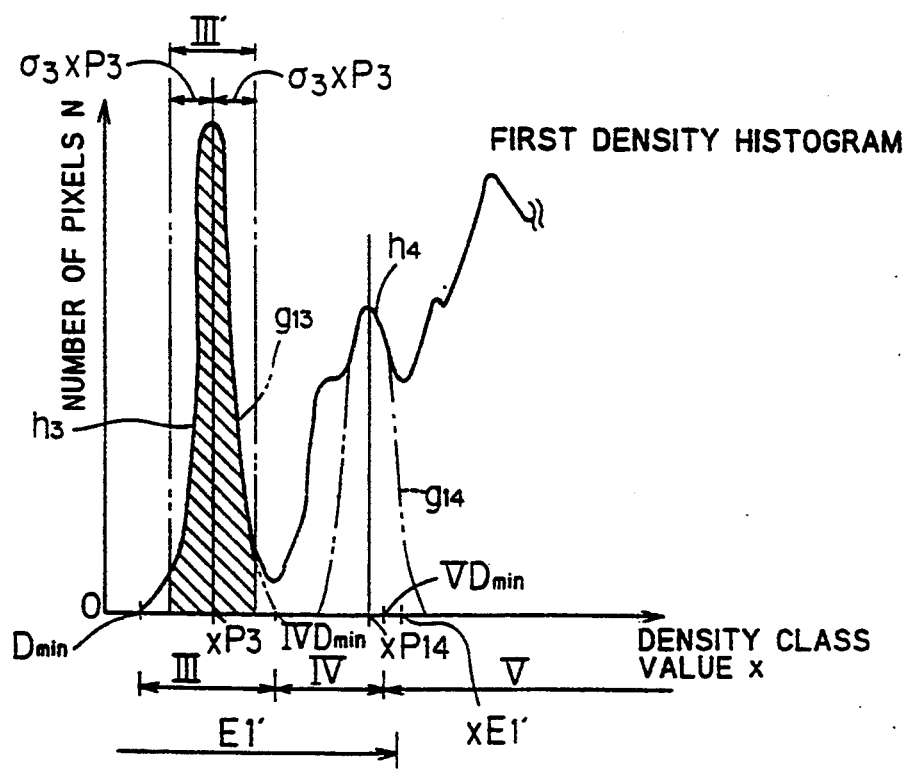
FIGS. 16A and 16B are views showing a first density histogram and a second density histogram, respectively, of where the original image is other type of negative film.

Opposite to this, when the color original F wound around the input cylinder 1 is a negative film, the first density histogram generated by the first density histogram generation means 18A in general exhibits a pixel distribution which includes two surge portions h3 and h4, which show concentration of the pixels, respectively at the density ranges III and IV at a lower density end of the graph, as shown in FIG. 15A. Exactly the same as the case shown in FIG. 13A, the density range III is a density range of image data regarding the no-original portion in which the color original F is not present on the input cylinder 1. On the other hand, the density range IV is a density range of image data regarding strip-like shape margins which are provided at both edges of the subject region of the negative film and in which holes for reeling the negative film are formed (i.e., unexposed portion). Such a negative type color original F includes a density range near said density range IV in a background portion of the subject region. With such a color original F, the first density histogram includes a surge portion h4 which appears from the density range V to the range IV as shown in FIG. 16A.

The peak position density rank value detection means 18B calculates peak position density rank values xP which correspond to all of the peaks of the pixel distribution surge portions of the first density histograms of FIGS. 13A to 16A. The peak position density rank values xP are computed in the same manner as that in the first preferred embodiment.

That is, first, a peak frequency Px is calculated in accordance with Eq. 1 for each density rank value x.

Plotting the peak frequency Px calculated based on Eq. 1, a single dot line as that shown in FIG. 13A, for example, is obtained which shows that the peak frequency Px crosses at the "0" level at the peak position density values. That is, the peak frequency Px is "0" or "a value approximate to 0" when said density rank value x is the peak position density rank value xP. When the density rank value is completely the same as the peak position density rank value xP, the peak frequency Px=0.

However, the density rank value x found by Eq. 1 does not necessarily coincide with a true peak position density value. Therefore, when the density rank value x does not coincide with a true peak position density value, further, when a distribution around a peak position density rank value xP does not have a normal profile, the peak frequency Px does not become zero. Hence, when the absolute value of a peak frequency Px is smaller than both the absolute value of a peak frequency $P(x-1)$ of a precedent density rank value $(x-1)$ and a peak frequency $P(x+1)$ of a next density rank value $(x+1)$, the density rank value x which gives the peak frequency Px is regarded as a peak position density rank value xP. In other words, in order that the density rank value x coincides with a peak position density rank value xP, Eq. 3 must be satisfied.

In addition, if the peak position density rank value xP is a peak position density rank value xP of a surge portion of the first density histogram, a peak frequency $P(xP+1)$ of a next density rank value $(xP+1)$ is greater than "0." On the other hand, if the peak position density rank value xP is a peak position density rank value xP of a valley portion of the first density histogram, the peak frequency $P(xP+1)$ of the next density rank value $(xP+1)$ is smaller than "0." That is, when Eq. 4 is satisfied, the density rank value x is equal to a peak position density rank value xP of a surge portion.

Following this, the second density histogram generation means 18B judges whether the peak position density rank value xP of a surge portion satisfying Eq. 4 is within a detection density range. The detection density range is set such that the detection density range does not overlap the density range of a subject region of an ordinary color original F and even if overlaps, an overlapping portion is minimum. In the case of FIG. 7A described above, a first detection density range E1 with a maximum density xE1 as a boundary density is set at a lower density side while a second detection density range E2 with a minimum density xE2 as a boundary density is set at a higher density side. In other words, when the color original F is a reversal positive film, the peak position density rank value xP of a surge portion to be detected must satisfy Eq. 5.

Figure 15B:
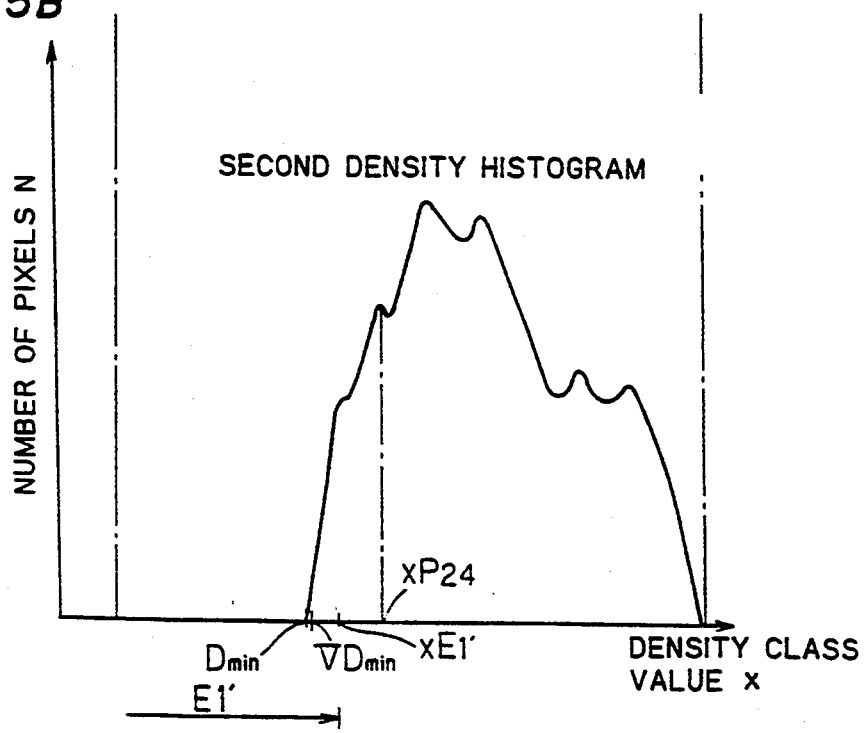

On the other hand, in the case of FIGS. 15A and 15B, only a third detection density range E1' with a maximum density xE1' as a boundary density is set at the lower density side. In short, when the color original F is a negative film, the peak position density rank value xP of a surge portion to be detected must satisfy Eq. 6.

Further, from the peak position density rank values xP which satisfy Eqs. 5 and 6, a peak position density rank value xP which satisfies a predetermined condition is selected by the second density histogram generation means 18B. For Eq. 5, the conditions (a) or (b) must be satisfied and for Eq. 6, the condition (c) must be satisfied.

In this preferred embodiment, the detection density ranges E1, E2 and E1' are determined only for the purpose of accuracy, and these may be omitted if not necessary.

(a) The peak position density rank value xP1 which corresponds to the surge portion h1 which is located at the lowest density part of the first detection density range E1.

(b) The peak position density rank value xP12 which corresponds to the surge portion h2 which is located at the highest density part of the second detection density range E2.

(c) The peak position density rank values xP3 and xP14 which correspond to the surge portions h3 and h4 which are located at the lowest and the second lowest parts of the third detection density range E1'.

The peak position density rank value detection means 18B outputs the peak position density rank values xP1, xP12 or xP3, xP14 to the above-mentioned second density histogram generation means 18C as first detected peak position density rank values.

Further, the peak position density rank value xP1 or xP3 is outputted to the pixel-to-be-removed determining means 18F.

The second density histogram generation means 18C removes cumulated pixels which are included in surge removal portions g11 and g12, respectively, having the peak position density rank values xP1 and xP12 as a center from the first density histogram generated about a reversal positive film such as that shown in FIG. 13A or 14A, to thereby generate the second density histogram. Alternatively, the second density histogram generation means 18C removes cumulated pixels which are included in surge removal portions g13 and g14, respectively, having the peak position density rank values xP3 and xP14 as a center from the first density histogram generated about a negative film such as that shown in FIG. 15A or 16A, to thereby generate the second density histogram. In this preferred embodiment, the surge removal portions g11, g12 or g13, g14 are each regarded as a region which is enclosed in a normal distribution curve.

In the following, the second density histogram will be described in detail in relation to where the color original F is a reversal positive film and where the color original F is a negative film.

If the color original F is a reversal positive film, the second density histogram is as follows.

Figure 13B:
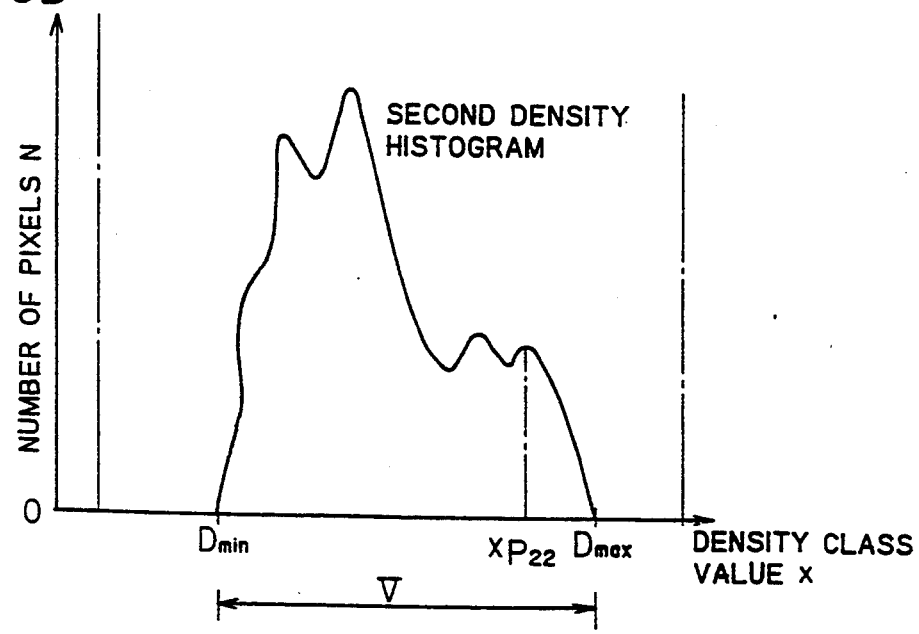

If the first density histogram is a density histogram which includes the surge portions h1, h2 as those shown in FIG. 13A at the both ends of the graph, the surge portions h1, h2 are included in the surge removal portions g11, g12. Hence, in the second density histogram, as shown in FIG. 13B, the minimum density $D_{min}$ becomes larger and the maximum density $D_{max}$ becomes smaller compared to those in the first density histogram. Moreover, the second density histogram does not include a surge portion in the higher density side to the surge portion h2 of the first density histogram.

Figure 14B:
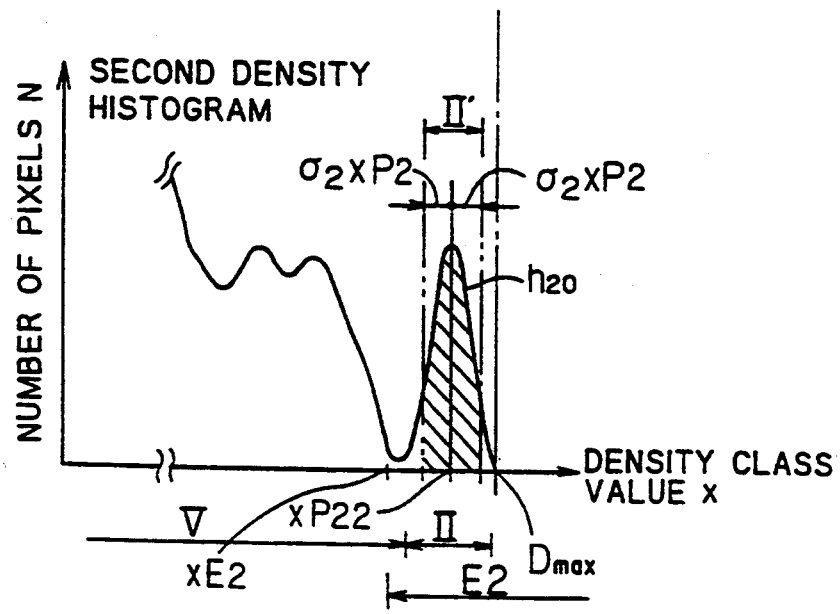

On the other hand, if the first density histogram is a density histogram which includes the surge portions h1, h2 such as those shown in FIG. 14A at the both ends of the graph, the surge portion h1 is entirely included in the surge removal portion g11 (See FIG. 13A) while the surge portion h2 is only partially included in the surge removal portion g12. Hence, in the second density histogram except for the pixels which are included in the surge removal portion g12, a new surge portion h20 appears in the higher density side instead of the surge portion h2 as shown in FIG. 14B. The surge portion h20 appears in the density range II, i.e., in the density range of the pixels which form the unexposed image portion, and is located at a higher density side to the surge portion h2. In this case, the pixels included in the surge removal portion g12 are the pixels which form the image of the subject region. On the other hand, the pixels which form the surge portion h20 in the second density histogram are the pixels which form the unexposed image portion of the reversal positive film. Therefore, the maximum $D_{max}$ of the second density histogram of FIG. 14B is approximately the same as the maximum density $D_{max}$ of the first density histogram of FIG. 14A.

If the color original F is a negative film, the second density histogram is as follows.

If the first density histogram is a density histogram which includes the surge portions h3, h4 as those shown in FIG. 15A at the lower density side of the graph, the surge portions h3, h4 are included in the surge removal portions g13, g14. With the pixels of the surge removal portions g13, g14 excluded, as shown in FIG. 15B, the minimum density $D_{min}$ of the second density histogram becomes larger than that of the first density histogram, amounting to a value which is equal to or approximately equal to the minimum density $D_{min}$ of the density range V of the subject region. In addition, the second density histogram does not include a surge portion at a lower density side to the second surge portion h4 of the first density histogram.

Figure 16B:
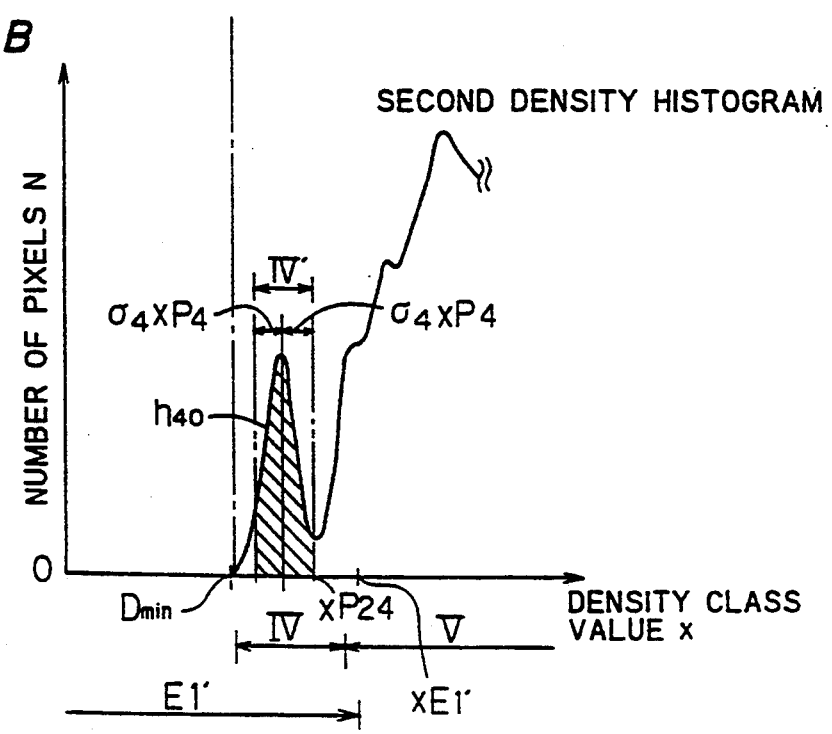

On the other hand, if the first density histogram is a density histogram which includes the surge portions h3, h4 as those shown in FIG. 16A at the lower density side of the graph, the surge portion h3 is entirely included in the surge removal portion g13 (See FIG. 15A) while the surge portion h4 is only partially included in the surge removal portion g14. Hence, in the second density histogram except for the pixels included in the surge removal portions g13, g14, a new surge portion h40 appears in the lower density side instead of the portions h3, h4 as shown in FIG. 16B. The surge portion h40 appears in the density range IV, i.e., in the density range of the pixels which form the unexposed image portion, and is located at a lower density side to the surge portion h4. In this case, the pixels included in the surge removal portion g14 are the pixels which form the image of the subject region. On the other hand, the pixels which form the surge portion h40 in the second density histogram are the pixels which form the unexposed image portion of the negative film. Therefore, the minimum $D_{min}$ of the second density histogram of FIG. 16B is greater than the minimum density $D_{min}$ of the first density histogram of FIG. 16A, and in addition, is approximately equal to the minimum density IV $D_{min}$ ($<V\ D_{min}$) of the density range IV of the first density histogram.

In exactly the same manner as it is in the case of the first peak position density rank value detection means 18B, regarding said second density histogram, the second peak position density rank value detection means 18D detects a second peak position density rank value xP22 which corresponds to the surge portion h20 which is located at the highest density part of the second detection density range E2 (See FIG. 14B) or a second peak position density rank value xP24 which corresponds to the surge portion h40 which is located at the lowest density part of said third detection density range E1' (See FIG. 16B). In the case of FIG. 13B, if without the condition regarding the second detection density range E2, the second peak position density rank value detection means 18D detects the second peak position density rank value xP22 shown in the drawing in the second density histogram (xP22<xP12).

If without the condition regarding the third detection density range E1', in the case of FIG. 15B the second peak position density rank value detection means 18D detects the second peak position density rank value xP24 shown in the second density histogram (xP24>xP14).

If the color original F is a reversal positive film (See FIGS. 13A, 13B, 14A and 14B), between the first peak position density rank value xP12 and the second peak position density rank value xP22, the comparison/selection means 18E selects one which is located at a higher density side.

As described earlier, when the surge portion h2 is created because of the image data of only the unexposed portion, if the condition regarding the second detection density range E2 is provided, the second peak position density rank value is not detected. If the condition regarding the second detection density range E2 is not provided, the second peak position density rank value xP22 is at a lower density side to the first peak position density rank value xP12 (FIGS. 13A and 13B). On the other hand, if the surge portion h2 is created because of the pixels which are composed by the pixels of the unexposed portion and the pixels of the subject region, the second peak position density rank value xP22 is located at a higher density side to the first peak position density rank value xP12 (FIGS. 14A and 14B). Hence, the comparison/selection means 18E selects the first peak position density rank value xP12 in the case of FIG. 13A and selects the second peak position density rank value xP22 in the case of FIG. 14A (See FIG. 14B). In other words, the pixels of the surge portion h2 in which the first peak position density rank value xP12 of FIG. 14A is included are excluded from the pixels-to-be-removed.

Further, when the color original F is a negative film (FIGS. 15A, 15B, 16A and 16B), between the second lowest first peak position density rank value xP14 and the second lowest first peak position density rank value xP24, the comparison/selection means 18E selects one which is located at a higher density side.

As described above, when the surge portion h4 is created because of the image data of only the unexposed portion, if the condition regarding the third detection density range E1' is provided, the second peak position density rank value is not detected. If the condition regarding the second detection density range E1' is not provided, the second peak position density rank value xP24 is at a higher density side to the first peak position density rank value xP14 (FIGS. 15A and 15B). On the other hand, the surge portion h4 is created because of the pixels which are composed of the pixels of the unexposed portion and the pixels of the subject region, the second peak position density rank value xP24 is located at a lower density side to the first peak position density rank value xP14 (FIGS. 16A and 16B). Hence, the comparison/selection means 18E selects the first peak position density rank value xP14 in the case of FIG. 15A and selects the second peak position density rank value xP24 in the case of FIG. 16A. In other words, the pixels of the surge portion h4 in which the first peak position density rank value xP14 of FIG. 16A is included are excluded from the pixels-to-be-removed.

The comparison/selection means 18E provides the pixel-to-be-removed determining means 18F with the selected peak position density rank value.

The pixel-to-be-removed determining means 18F determines pixels which are to be removed from all the pixels which form the data read region in accordance with the first peak position density rank value xP1 or xP3 received from the first peak position density rank value detection means 18B and in accordance with the selected peak position density rank value received from the comparison/selection means 18E. In the following, of the peak position density rank values given to the pixel-to-be-removed determining means 18F, the peak position density rank value xP12 or xP22 is replaced with the peak position density rank value xP2 and the peak position density rank value xP14 or xP24 is replaced with the peak position density rank value xP4 for clarity of explanation.

The pixel-to-be-removed determining means 18F determines pixel removal density ranges of surge portions in which the peak position density rank values xP1 to xP4 are located at the center. The pixel-to-be-removed determining means 18F then detects, as the pixels-to-be-removed, pixels whose average densities, which have been calculated by the first density histogram generation means 18A, are included in the pixel removal density ranges. Likewise in the first preferred embodiment, finding in accordance with Eq. 7, a dispersion value $\sigma \cdot xP$ having the peak position density rank value xP as a center, the pixel removal density ranges are defined by Eq. 8.

Hence, a pixel removal density range I' around the peak position density rank value xP1, a pixel removal density range II' around the peak position density rank value xP2, a pixel removal density range III' around the peak position density rank value xP3 and a pixel removal density range IV' around the peak position density rank value xP4 are defined by Eq. 9.

Pixels which correspond to the pixel removal density ranges I', II', III' and IV', i.e., the pixels-to-be-removed are pixels which are included in the portions shadowed with oblique lines in FIGS. 13A, 14B, 15A, 16A and 16B. The pixel-to-be-removed determining means 18F then provides the third density histogram generation means 18G with information about the pixels-to-be-removed.

The third density histogram generation means 18G removes the pixels-to-be-removed found by said pixel-to-be-removed determining means 18F from all the pixels read from said first frame memories 34 and calculates an average density for the color components R, G and B with respect to each one of the pixels which remain unremoved. The third density histogram generation means 18G then generates a third density histogram which shows a relation between the average density and the number of pixels by which the average density is found (not shown).

The cumulative density histogram generation means 18H accumulates pixel appearance frequencies for the respective density rank values of the third density histogram in an increasing order of the density rank values to thereby generate a cumulative density histogram. In this case, a cumulative relative frequency histogram which is similar to that shown in FIG. 20 is generated in which a cumulative value of the appearance frequencies is shown as a relative frequency. The cumulative relative frequency histogram developed in this manner is used as a cumulative frequency histogram.

The reference density point determining means 18J applies cumulative relative frequencies RNH and RNS, which have been found in advance to find an optimum highlight density DH and an optimum shadow density DS, to the cumulative relative frequency histogram in order to find a highlight density DH and a shadow density DS which correspond to the cumulative relative frequencies RNH and RNS (See FIG. 20). Next, halftone-dot area rates which correspond to the highlight and the shadow densities DH and DS are set and the highlight point HL and the shadow point SD are found which serve as reference density points of a gradation curve on the gradation conversion coordinate plane (FIG. 21).

The gradation curve setting means 18K then determines a gradation curve such as that shown in FIG. 21 which passes through the highlight point HL and the shadow point SD.

The method for establishing a gradation curve based on the third density histogram is described in U.S. Pat. No. 4,792,979 mentioned earlier and U.S. Pat. No. 4,984,071 disclosed also by the inventor of the present invention.

Figure 11:
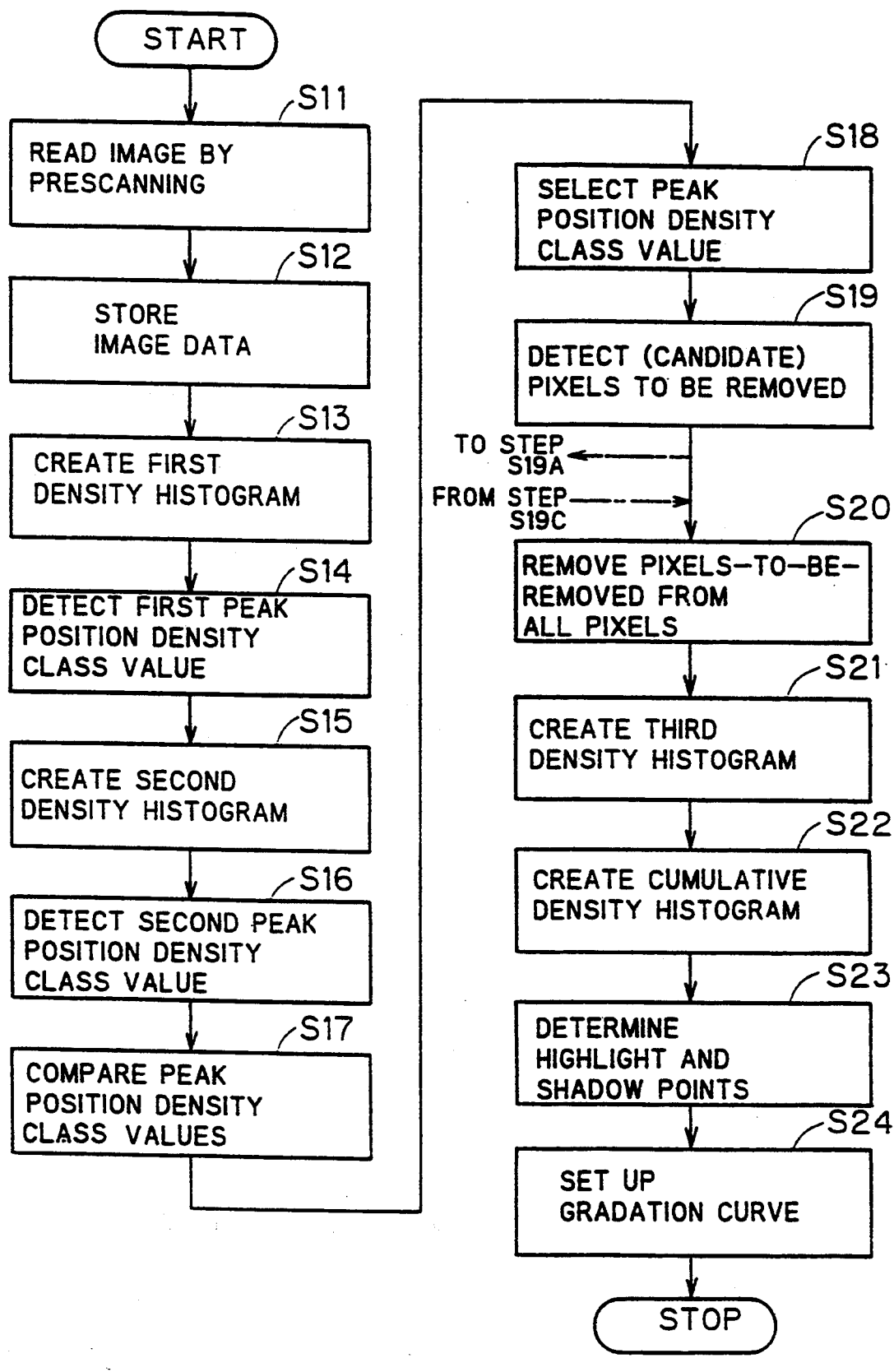
FIG. 11 is a flow chart for explaining a method of establishing a gradation conversion curve according to a second preferred embodiment of the present invention.

FIG. 11 is a flow chart for explaining a method of establishing reference density points by the above-mentioned color process scanner.

First, at a step S11, by prescanning, the image of the color original F, i.e., the target object, which is wound on the input cylinder 1 is read, simultaneously with which the image of a peripheral region on the periphery of the color original F is read.

At a step S12, the image data read at the step S11 are stored in the first frame memories 34.

Next, at a step S13, the first density histogram generation means 18A reads the image data from said first frame memories 34. Based on the image data, the first density histogram as that shown in FIGS. 13A, 14A, 15A and 16A is generated.

Next, at a step S14, the second density histogram generation means 18B detects, in the first density histogram generated at the step S13, the peak position density rank values xP1, xP12 or xP3, xP14 which are within the first, second or third detection density ranges E1, E2 or E1', respectively, and which satisfy the conditions (a), (b) or (c), respectively, in the detection density ranges E1, E2 or E1'.

Next, at a step S15, the second density histogram generation means 18C generates the second density histogram which is equal to the first density histogram as it would be after the pixels which are included in the surge removal portions g11, g12 or g13, g14 are removed (See FIGS. 13B, 14B, 15B and 16B).

At a step S16, as to the second density histogram, the second peak position density rank value detection means 18D detects the second peak position density rank value xP22 or xP24.

At a step S17, the comparison/selection means 18E compares the density rank value xP12 with the density rank value xP22 and the density rank value xP14 with the density rank value xP24.

At a step S18, between the first peak position density rank value xP12 and the second peak position density rank value xP22, the comparison/selection means 18E selects one which is located at a higher density side based on the result of comparison found at the step S17. Alternatively, between the first peak position density rank value xP14 and the second peak position density rank value xP24, the comparison/selection means 18E selects one which is located at a lower density side based on the result of comparison found at the step S17. The peak position density rank value which was not selected is deleted.

At a step S19, the pixel-to-be-removed determining means 18F determines the pixel removal density ranges I', II' or III', IV' of the surge portions in which the peak position density rank values xP1, xP2 (xP2=xP12 or xP22) or xP3, xP4 (xP4=xP14 or xP24) are located at the center. The pixels whose average densities are included in the pixel removal density ranges I', II' or III', IV' are determined as the pixel-to-be-removed.

As a step S20, the pixel-to-be-removed found at the step S19 are removed from all the pixels corresponding to the image data read from the first frame memories 34.

At a step S21, in accordance with the average densities of the respective pixels, the third density histogram generation means 18G generates the third density histogram about the pixels which remain after the pixel-to-be-removed are removed from all pixels. The third density histogram shows a relation between the average density and the number of pixels by which the average density is found.

At a step S22, cumulative density histogram generation means 18H generates the cumulative density histogram (See FIG. 20) from the third density histogram generated at the step S21.

At a step S23, the reference density point determining means 18J applies the cumulative relative frequencies RNH and RNS, which have been found in advance, to the cumulative relative frequency histogram in order to find a highlight point HL and a shadow point SD each serving as an optimum reference density point.

At a step S24, the gradation curve setting means 18K establishes a gradation curve which passes through said highlight and said shadow points HL and SD.

The characteristics of the gradation curve developed in this manner are set up in the look-up tables 37.

The scan/read head 2 then scans the original image to generate an image signal which will be thereafter gradation-converted into an image signal in accordance with the gradation curve which is set up in the look-up tables 37. The gradation-converted image signal is converted by the dot generator 4 into a halftone dot signal in accordance with which a halftone dot image is recorded on the photosensitive material E which is wound on the output cylinder 6, thereby a reproduced image is reproduced thereon.

<Mask Processing in Second Preferred Embodiment>

Figure 17:
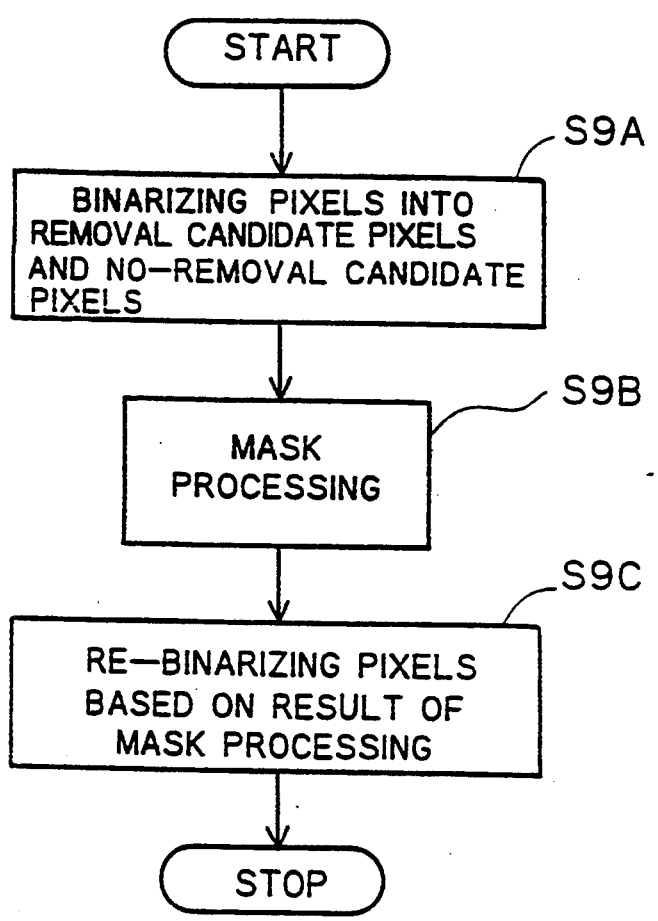
FIG. 17 is a flow chart for explaining mask processing in the second preferred embodiment.
Figure 18:
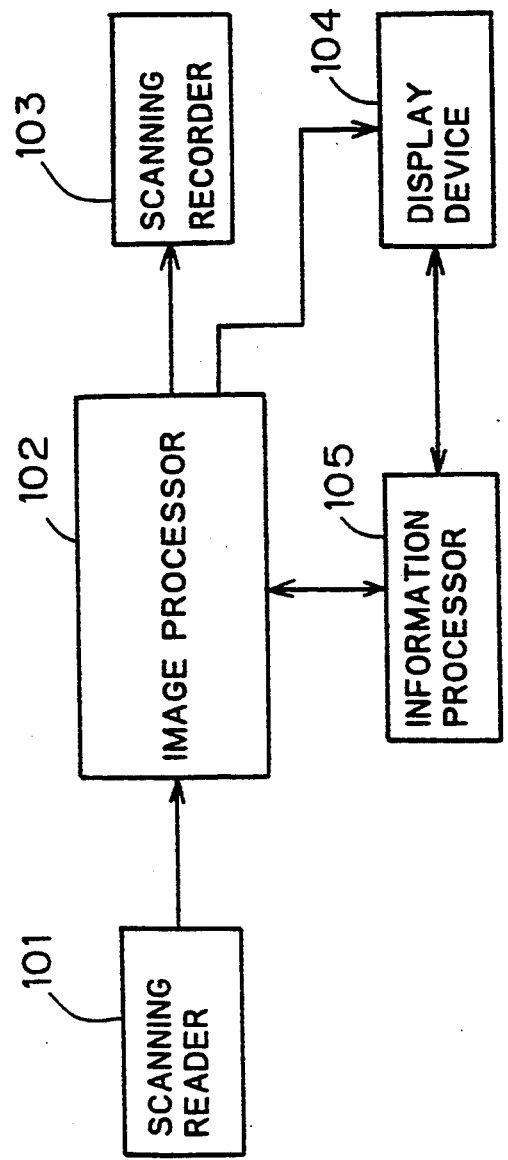
FIG. 18 is a schematic view showing the structure of a conventional color process scanner.
Figure 19:
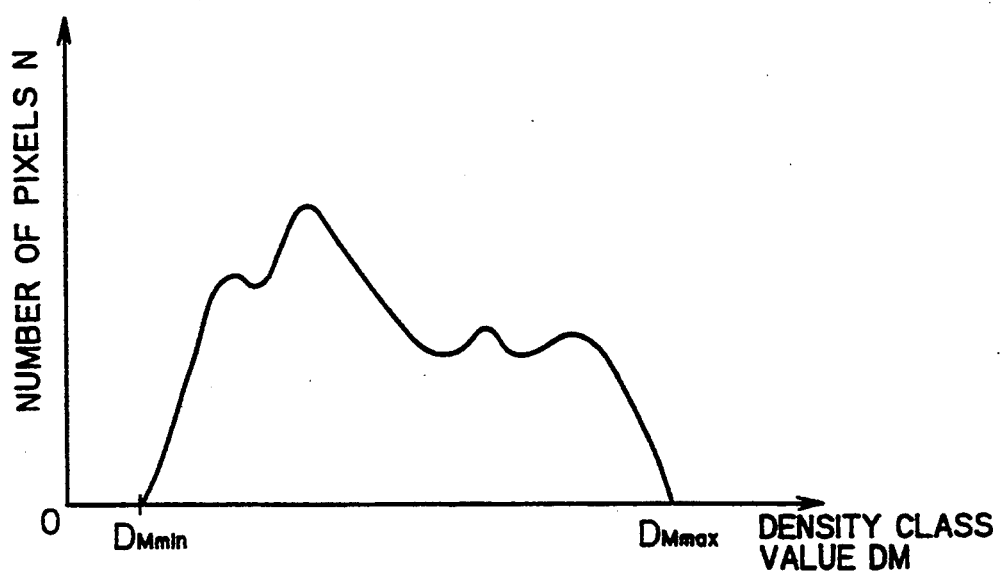
FIG. 19 is a view showing a density histogram which is necessary for generating a gradation curve.

In the second preferred embodiment, mask processing similar to the first preferred embodiment is performed to enable more accurate image conversion. More precisely, the steps S19A to S19C shown in FIG. 17 are executed as an interposing routine between the steps S19 and S20 shown in FIG. 11. In a preferred embodiment where the steps S19A to S19C are carried out, the pixels included in said pixel removal density ranges I', II' or III', IV' found in the step S19 in the precedent embodiment are not used as the pixels-to-be-removed. Instead, these pixels are used as removal candidate pixels in proceeding to the step S19A.

At the step S19A, based on the data read about all pixels of a data read region A read from the first frame memories 34, the pixels are divided into the removal candidate pixels determined at the step S19 of FIG. 11 and pixels otherwise, i.e., no-removal candidate pixels, whereby the pixels are binarized. If the image of the data read region A such as that shown in FIG. 9A is binarized into the removal candidate pixels and the no-removal candidate pixels, a binary image is obtained such as that shown in FIG. 9B, for example, in which a portion formed by the no-removal candidate pixels is shadowed with oblique lines. FIG. 10A shows an image region T1 which is formed by 81 pixels, i.e., pixels Hi to Hi+8 by pixels Vj to Vj+8 while FIG. 10B shows an image region T2 which is formed by 49 pixels, i.e., pixels Hm to Hm+6 by pixels Vn to Vn+6. In FIGS. 10A and 10B, binary "1" removal candidate pixels found at the step S19A are encircled and binary "0" removal candidate pixels are not encircled.

In the step S19B, a mask is created which encloses an odd number of pixels in the form of a matrix in which an equal number of pixels are arranged in vertical and horizontal directions, and average binary value of the pixels enclosed by the mask is calculated. The binary value of a center pixel within the mask is replaced with the average binary value which is calculated in the manner above.

In the case where of pixels enclosed by a mask M which covers $5 \times 5$ pixels (the hatched portions of FIGS. 10A and 10B), the binary value of a pixel which is located at a center is replaced with an average binary value of the binary values of 25 pixels which are covered by the mask M, the binary values of the removal candidate pixels are replaced as shown in FIGS. 10A and 10B similarly to the first preferred embodiment.

Next, in the step S19C, the binary values of the respective pixels processed at the step S19B are once again binarized using a predetermined threshold value, thereby determining pixels-to-be-removed.

For instance, if said the threshold value is set at 20/25 in the case of FIG. 10A, of the pixels having an average binary value of 21/25, only Hi+4×Vi+4 pixel is determined as the pixel-to-be-removed. If said threshold value is set at 16/25, Hi+3×Vj+4 pixel and Hi+4×Vj+3 to Vj+5 pixels, i.e., 5 pixels in total, are determined as the pixels-to-be-removed. FIG. 9C shows an image obtainable from the binary image of FIG. 9B after the mask processing and subsequent re-binarizing.

In this preferred embodiment, determination of the pixels-to-be-removed at the step S19C above is followed by the step S20 of FIG. 11 in which the pixels-to-be-removed found at the step S19C are removed from all the pixels read from the first frame memory 34.

The mask processing means 18H for executing the routine of the steps S19A to S19C above is disposed in the information processing part 8 as shown in FIG. 12. By carrying out the inserted routine of the steps S19A to S19C, the removal candidate pixels isolated in the no-removal candidate pixels can be removed from the pixels-to-be-removed which are determined at the step S19. It is also possible that the no-removal candidate pixels isolated the removal candidate pixels are included in the pixels-to-be-removed which are determined at the step S19, on the contrary to this.

That is, even if the removal candidate pixels are present within the subject region, some or all of the removal candidate pixels can be used in generating the third density histogram at the step S21. In addition, even if the subject region includes the no-removal candidate pixels because of a character or the like in the unexposed portion of a film, some or all of the no-removal candidate pixels can be excluded from pixels which are used in generating the third density histogram at the step S21. Hence, more accurate analysis is possible by carrying out the inserted routine of the steps S19A to S19C above.

The film selection means 18M shown by the double dot line in FIG. 12 is provided so that an operator inputs the type of the color original F (i.e., whether the color original F is a reversal positive film or a negative film) in the film selection means 18M. In accordance with the instruction entered in the film selection means 18M, the respective procedures are executed to be adaptive to the film type.

The foregoing has described that the original F is a color original. However, the present invention is not limited to where the original F is a color original but is applicable to where the original F is a monochrome original.

The foregoing has also described that the scanning reader and the scanning recorder are each a cylinder-equipped rotary type unit in the preferred embodiments above. Instead, the scanning reader and the scanning recorder each may be a flat-bed scanning type unit.

Further, although the preferred embodiments above requires prescanning and scanning, the present invention may be applied to where scanning is carried out only once.

In addition, although the foregoing has described that an average density for the color components B, G and R is obtained to generate a density histogram, a density value for one color component, e.g. a color component of G, may be used instead. Alternatively, a density histogram may be created for each one of the color components B, G and R so that image data for each color component are processed based on an associated density histogram. As still other modification is possible wherein density values for the color components B, G and R are converted into brightness values from which histograms are generated since such histograms are included in density histograms in the present invention.

While the invention has been described in detail, the foregoing description is in all aspects illustrative and not restrictive. It is understood that numerous other modifications and variations can be devised without departing from the scope of the invention.

I claim:

1. An image signal conversion apparatus for converting a first image signal obtained by scanning an original image having a gradation into a second image signal to produce a modified gradation, wherein said original image consists of a pixel array which is scanned to obtain a data read region and said first image signal represents respective values of densities of pixels included in said pixel array, said image signal conversion apparatus comprising:
   (a) means for classifying said pixels into a plurality of density ranks in accordance with the respective values of said first image signal and generating a first density histogram representing the number of pixels which belong to the respective density ranks, said first density histogram including at least one peak portion;
   (b) means for extracting a peak portion which satisfies a predetermined condition from said at least one peak portion to thereby obtain a detected peak portion;
   (c) means for calculating a pixel removal density range in accordance with a density rank value which corresponds to said detected peak portion;
   (d) means for extracting pixels whose value of said first image signal belongs to said pixel removal density range from pixels which form said data read region to thereby obtain pixels-to-be-removed;
   (e) means for classifying pixels which remain after removal of said pixels-to-be-removed from said pixels which form said data read region into a plurality of density ranks in accordance with the values of said first image signal to thereby generate a second density histogram representing the number of pixels which belong to the respective density ranks;
   (f) means for determining a reference point on a gradation conversion coordinate plane in accordance with said second density histogram;
   (g) means for determining signal conversion characteristics in accordance with said reference point;
   (h) means for setting said signal conversion characteristics in a signal converter; and
   (i) means for inputting said first image signal to said signal converter and receiving an output signal from said signal converter as said second image signal, whereby said first image signal is converted into said second image signal.

2. The image signal conversion apparatus of claim 1, wherein said data read region comprises a subject region and a peripheral region surrounding said subject region;
   said subject region is a subject region of a reversal positive film, wherein said means for extracting a peak portion comprises:
   (b-1) means for detecting a first peak portion of a lowest density part of a density range of said first density histogram; and
   (b-2) means for detecting a second peak portion of a highest density part of the density range of said first density histogram,
   and wherein said detected peak portion includes said first peak portion and said second peak portion which are detected by said means for detecting a first peak portion and said means for detecting a second peak portion, respectively.

3. The image signal conversion apparatus of claim 2, wherein said first peak portion is located within a first detection density range which is set at a lower density side end of the density range of said first density histogram,
   and wherein said second peak portion is located within a second detection density range which is set at a higher density side end of the density range of said first density histogram.

4. The image signal conversion apparatus of claim 3, wherein said first detection density range and said second detection density range are set in such a manner that they do not substantially overlap the density range of said subject region.

5. The image signal conversion apparatus of claim 1, wherein said data read region comprises a subject region and a peripheral region surrounding said subject region;
   said subject region is a subject region of a negative film, wherein said means for extracting a peak portion comprises:
   (b-3) means for detecting peak portions which are located at a lowest part and a second lowest part of a density range of said first density histogram, and wherein said detected peak portion includes said peak portions which are located at the lowest and the second lowest parts which are detected by said means for detecting peak portions which are located at a lowest part and a second lowest part of a density range of said first density histogram.

6. The image signal conversion apparatus of claim 5, wherein said means for extracting a peak portion further comprises:

(b-4) means for setting a third detection density range at a lower density side end of the density range of said first density histogram, and wherein said means for detecting peak portions which are located at a lowest Dart and a second lowest part of a density range of said first density histogram comprises means for detecting in said third detection density range said peak portions which are located at the lowest and the second lowest parts.

7. The image signal conversion apparatus of claim 6, wherein said means for setting a third detection density range comprises means for setting said third detection density range so that said third detection density range does not substantially overlap the density range of said subject region.

8. The image signal conversion apparatus of claim 1, wherein said means for extracting pixels comprises:

(d-1) means for preparing a mask having a pixel range of a predetermined size;

(d-2) means for overlapping said mask on a portion of the image of said data read region;

(d-3) means for dividing pixels of said portion of said data read region into first pixels having densities which belong to said pixel removal density range and second pixels having densities which do not belong to said pixel removal density range and assigning a first value and a second value to said first and said second pixels respectively, whereby first binarization is attained;

(d-4) means for calculating an average value of said first and said second values, which are assigned by said first binarization, as to the pixels of said portion of said data read region and replacing a value of a pixel which is located at a center within said mask with said average value to thereby obtain a pixel which has a converted value;

(d-5) means for gradually changing the position of said mask on the image of said data read region while repeating the operations of said means to for preparing a mask, said means for overlapping said mask, means for dividing pixels; and said means for calculating an average value to thereby obtain a plurality of pixels each having a converted value;

(d-6) means for dividing said plurality of pixels each having said converted value into third pixels and fourth pixels using a predetermined threshold value and assigning a third value and a fourth value to said third and said fourth pixels, respectively, whereby second binarization is attained; and (d-7) means for determining said pixels-to-be-removed in accordance with said third and said fourth values which are assigned to the respective pixels by said second binarization.

9. The image signal conversation apparatus of claim 1, wherein said means for calculating a pixel removal density range comprises:

(c-1) means for setting said pixel removal density range in a predetermined density range which includes a density rank value corresponding to said detecting peak portion as a center.

10. The image signal conversion apparatus of claim 9, wherein said means for determining a reference point comprises:

(f-1) means for accumulating appearance frequencies of the pixels of the respective density ranks in accordance with said second density histogram to thereby generate a cumulative density histogram;

(f-2) means for applying a cumulative appearance frequency which has been determined in advance to said cumulative density histogram to thereby determine a reference density; and (f-3) means for applying said reference density to said gradation conversion coordinate plane to thereby determine said reference point.

11. The image signal conversion apparatus of claim 10, wherein the image of said data read region is a color image, and wherein said first image signal includes color component signals.

12. The image signal conversion apparatus of claim 11, wherein said means for classifying said pixels comprises:

(a-1) means for averaging said color component signals of each pixel to thereby obtain said respective values of said first image signal.

13. The image signal conversion apparatus of claim 11, wherein said means for classifying said pixels comprises (a-2) means for finding said respective values of said first image signal in accordance with the respective values of said color component signals of each pixel.

14. The image signal conversion apparatus of claim 11, wherein said means for classifying said pixels comprises:

(a-3) means for selecting one of said color component signals; and (a-4) means for finding said respective values of said first image signal in accordance with the respective values of selected color component signals.

15. An image signal conversion apparatus for converting a first image signal obtained by scanning an original image having a gradation into a second image signal to produce a modified gradation, wherein said original image consists of a pixel array which is scanned to obtain a data read region, said data read region comprising a subject region and a peripheral region surrounding said subject region, said first image signal represents respective values of densities of pixels included in said pixel array, said image signal conversion apparatus comprising:

(a) means for classifying said pixels into a plurality of density ranks in accordance with the respective values of said first image signal and generating a first density histogram representing the number of pixels which belong to the respective density ranks, said first density histogram including at least one peak portion;

(b) means for extracting a peak portion which satisfies a predetermined first condition which corresponds to said peripheral region from said at least one peak portion to thereby obtain a first removal candidate peak portion;

(c) means for classifying pixels which remain after removal of pixels which are included in a pixel distribution surge portion around said first removal candidate peak portion from the pixels which form said data read region into a plurality of density ranks in accordance with the respective values of said first image signal and generating a second density histogram representing the number of pixels which belong to the respective density ranks, said second density histogram including at least one peak portion;

(d) means for extracting a peak portion which satisfies a predetermined second condition which corresponds to said peripheral region from said at least one peak portion of said second density histogram to thereby obtain a second removal candidate peak portion;

(e) means for comparing the density of said first removal candidate peak portion with the density of said second removal candidate peak portion;

(f) means for selecting a removal cancel peak portion from said first and second removal candidate peak portions in accordance with a result of said comparison;

(g) means for calculating a pixel removal density range which includes a peak portion which remains after excluding said removal cancel peak portion from said first and said second removal candidate peak portions;

(h) means for selecting pixels whose value of said first image signal belongs to said pixel removal density range among the pixels which form said data read region as pixels-to-be-removed;

(i) means for classifying pixels which remain after removal of said pixels-to-be-removed from the pixels which form said data read region into a plurality of density ranks in accordance with the values of said first image signal to thereby generate a third density histogram representing the number of pixels which belong to the respective density ranks;

(j) means for determining a reference point on a gradation conversion coordinate plane in accordance with said third density histogram;

(k) means for determining signal conversion characteristics in accordance with said reference point;

(l) means for setting said signal conversion characteristics in a signal converter; and (m) means for inputting said first image signal to said signal converter and receiving an output signal from said signal converter as said second image signal, whereby said first image signal is converted into said second image signal.

16. The image signal conversion apparatus of claim 15, wherein said subject region is a subject region of a reversal positive film, wherein said means for extracting a peak portion which satisfies a predetermined first condition comprises:

(b-1) means for detecting a first peak portion of a lowest density part of a density range of said first density histogram; and (b-2) means for detecting a second peak portion of a highest density part of the density range of said first density histogram, and wherein said detected peak portion includes said first peak portion and said second peak portion which are detected by said means for detecting a first peak portion and said means for detecting a second peak portion, respectively.

17. The image signal conversion apparatus of claim 16, wherein said means for extracting a peak portion which satisfies a predetermined second condition comprises:

(d-1) means for detecting a highest density side peak portion which is located nearest to a higher density side end of a density range of said second density histogram, and wherein said second removal candidate peak portion includes said highest density side peak portion which is detected by said means for detecting a highest density side peak portion.

18. The image signal conversion apparatus of claim 17, wherein said means for selecting a removal cancel peak portion comprises:

(f-1) means for determining said first removal candidate peak portion which is located nearer to the higher density side end as said removal cancel peak portion if the density of said second removal candidate peak portion is higher than the density of said first removal candidate peak portion which is located nearer to the higher density side end.

19. The image signal conversion apparatus of claim 15, wherein said subject region is a subject region of a negative film, wherein said means for extracting a peak portion which satisfies a predetermined first condition comprises:

(b-3) means for detecting peak portions which are located at a lowest part and a second lowest part of the density range of said first density histogram, and wherein said detected peak portion includes said peak portions which are located at the lowest and the second lowest parts which are detected by said means for detecting peak portions which are located at a lowest part and a second lowest part of the density range of said first density histogram.

20. The image signal conversion apparatus of claim 19, wherein said means for extracting a peak portion which satisfies a predetermined second condition comprises:

(d-2) means for detecting a first peak portion which is located at the lowest part of the density range of said second density histogram, and wherein said second removal candidate peak portion includes said first peak portion which is detected by said means for detecting a first peak portion.

21. The image signal conversion apparatus of claim 20, wherein said means for selecting a removal cancel peak portion comprises:

(f-2) means for determining said first removal candidate peak portion which is located at the lowest part as said removal cancel peak portion if the density of said second removal candidate peak portion is lower than the density of said first removal candidate peak portion which is located at the lowest part.

22. The image signal conversion apparatus of claim 15,
wherein said means for selecting pixels comprises:
(h-1) means for preparing a mask having a pixel range of a predetermined size;
(h-2) means for overlapping said mask on a portion of the image of said data read region;
(h-3) means for dividing pixels of said portion of said data read region into first pixels having densities which belong to said pixel removal density range and second pixels having densities which do not belong to said pixel removal density range and assigning a first value and a second value to said first and second pixels, respectively, whereby first binarization is attained;
(h-4) means for calculating an average value of said first and said second values as to the pixels of said portion of said data read region and replacing a value of a pixel which is located at a center within said mask with said average value to thereby obtain a pixel which has a converted value;
(h-5) means for gradually changing the position of said mask on the image of said data read region while repeating the operations of said means to for preparing a mask, said means for overlapping said mask, said means for dividing pixels of said portion and said means for calculating an average value to thereby obtain a plurality of pixels each having a converted value;
(h-6) means for dividing said plurality of pixels each having said converted value into third pixels and fourth pixels using a predetermined threshold value and assigning a third value and a fourth value to said third and said fourth pixels, respectively, whereby second binarization is attained; and
(h-7) means for determining said pixels-to-be-removed in accordance with said third and said fourth values which are assigned to the respective pixels by said second binarization.

23. The image signal conversion apparatus of claim 15, wherein said means for calculating a pixel removal density range comprises:
(g-1) means for setting said pixel removal density range as to a predetermined density range around a peak portion of each one of said first and said second removal candidate peak portions except for said removal cancel peak portion.

24. The image signal conversion apparatus of claim 23,
wherein said means for determining a reference point comprises:
(j-1) means for accumulating appearance frequencies of the pixels of the respective density ranks in accordance with said second density histogram to thereby generate a cumulative density histogram;
(j-2) means for applying cumulative appearance frequencies which have been determined in advance to said cumulative density histogram to thereby determine a reference density; and
(j-3) means for applying said reference density to said gradation conversion coordinate plane to thereby determine said reference point.

25. The image signal conversion apparatus of claim 24,
wherein the image of said data read region is a color image,
and wherein said first image signal includes color component signals.

26. The image signal conversion apparatus of claim 25,
wherein said means for classifying said pixels comprises:
(a-1) means for averaging said color component signals of each pixel to thereby obtain said respective values of said first image signal.

27. The image signal conversion apparatus of claim 25,
wherein said means for classifying said pixels comprises:
(a-2) means for finding said respective values of said first image signal in accordance with the respective values of said color component signals of each pixel.

28. The image signal conversion apparatus of claim 25,
wherein said means for classifying said pixels comprises:
(a-3) means for selecting one of said color component signals; and
(a-4) means for finding said respective values of said first image signal in accordance with the respective values of a selected color component signal.

29. An image signal generating and converting apparatus comprising:
(a) a scanner for scanning an image having a subject region and a peripheral region surrounding the subject region, the scanner scanning the image only once without selectively scanning the subject region and the peripheral region of the image to obtain a data read region, the image having a gradation and including a pixel array formed by a plurality of pixels;
(b) an image signal generator for generating a first image signal from said image read region scanned by said scanner, said first image signal representing respective values of densities of said pixel array;
(c) an image signal converter for converting said first image signal into a second image signal to produce a modified gradation, said image signal converter comprising:
(c-1) a first classifier for classifying said pixels into a plurality of density ranks in accordance with the respective values of said first image signal and generating a first density histogram representing the number of pixels which belong to the respective density ranks, said first density histogram including at least one peak portion;
(c-2) a first extractor for extracting a peak portion which satisfies a predetermined condition from said at least one peak portion to thereby obtain a detected peak portion;
(c-3) a pixel removal density range calculator for calculating a pixel removal density range in accordance with a density rank value which corresponds to said detected peak portion;
(c-4) a second extractor for extracting pixels whose value of said first image signal belongs to said pixel removal density range from pixels which form said data read region to thereby obtain pixels-to-be-removed;

(c-5) a second classifier for classifying pixels which remain after removal of said pixels-to-be-removed from said pixels which form said data read region into a plurality of density ranks in accordance with the values of said first image signal to thereby generate a second density histogram representing the number of pixels which belong to the respective density ranks;

(c-6) a reference point selector for determining a reference point on a gradation conversion coordinate plane in accordance with said second density histogram;

(c-7) a determiner for determining signal conversion characteristics in accordance with said reference point;

(c-8) a setter for setting said signal conversion characteristics in a signal converter;

(c-9) an image signal input/output device for inputting said first image signal to said converter and receiving an output signal from said signal converter as said second image signal, whereby said first image signal is converted into said second image signal.

30. An image signal generating and converting apparatus comprising:

(a) a scanner for scanning an image having a subject region and a peripheral region surrounding the subject region, the scanner scanning the image only once without selectively scanning the subject region and the peripheral region to obtain a data read region, the image having a gradation and including a pixel array formed by a plurality of pixels;

(b) an image signal generator for generating a first image signal from said image read region scanned by said scanner, said first image signal representing respective values of densities of said pixel array;

(c) an image signal converter for converting said first image signal into a second image signal to produce a modified gradation, said image signal converter comprising:

(c-1) a first classifier for classifying said pixels into a plurality of density ranks in accordance with the respective values of said first image signal and generating a first density histogram representing the number of pixels which belong to the respective density ranks, said first density histogram including at least one peak portion;

(c-2) a first extractor for extracting a peak portion which satisfies a predetermined first condition which corresponds to said peripheral region from said at least one peak portion to thereby obtain a first removal candidate peak portion;

(c-3) a second classifier for classifying pixels which remain after removal of pixels which are included in a pixel distribution surge portion around said first removal candidate peak portion from the pixels which form said data read region into a plurality of density ranks in accordance with the respective values of said first image signal and generating a second density histogram representing the number of pixels which belong to the respective density ranks, said second density histogram including at least one peak portion;

(c-4) a second extractor for extracting a peak portion which satisfies a predetermined second condition which corresponds to said peripheral region from said at least one peak portion of said second density histogram to thereby obtain a second removal candidate peak portion;

(c-5) a comparator for comparing the density of said first removal candidate peak portion with the density of said second removal candidate peak portion;

(c-6) a first selector for selecting a removal cancel peak portion from said first and second removal candidate peak portions in accordance with a result of said comparison;

(c-7) a pixel removal density range calculator for calculating a pixel removal density range which includes a peak portion which remains after excluding said removal cancel peak portion from said first and said second removal candidate peak portions;

(c-8) a second selector for selecting pixels whose value of said first image signal belongs to said pixel removal density range among the pixels which form said data read region as pixels-to-be-removed;

(c-9) a third classifier for classifying pixels which remain after removal of said pixels-to-be-removed from the pixels which form said data read region into a plurality of density ranks in accordance with the values of said first image signal to thereby generate a third density histogram representing the number of pixels which belong to the respective density ranks;

(c-10) a first determiner for determining a reference point on a gradation conversion coordinate plane in accordance with said third density histogram;

(c-11) a second determiner for determining signal conversion characteristics in accordance with said reference point;

(c-12) a setter for setting said signal conversion characteristics in a signal converter; and (c-13) an image signal input/output device for inputting said first image signal to said signal converter and receiving an output signal from said signal converter as said second image signal, whereby said first image signal is converted into said second image signal.

* * * * *